US011687931B2

(12) United States Patent
Gupta et al.

(10) Patent No.: US 11,687,931 B2
(45) Date of Patent: Jun. 27, 2023

(54) PAYMENT METHODS AND SYSTEMS BASED ON A DECEPTIVE PIN OF A PAYMENT CARD

(71) Applicant: Mastercard International Incorporated, Purchase, NY (US)

(72) Inventors: Sudhir Gupta, Pune (IN); Harsh Piparsaniya, Pune (IN); Rahul Agrawal, Pune (IN)

(73) Assignee: Mastercard International Incorporated, Purchase, NY (US)

( * ) Notice: Subject to any disclaimer, the term of this patent is extended or adjusted under 35 U.S.C. 154(b) by 7 days.

(21) Appl. No.: 16/577,068

(22) Filed: Sep. 20, 2019

(65) Prior Publication Data

US 2020/0097970 A1 Mar. 26, 2020

(30) Foreign Application Priority Data

Sep. 21, 2018 (SG) ............................ 10201808244Y

(51) Int. Cl.
*G06Q 20/40* (2012.01)
*G06K 19/077* (2006.01)
*G06Q 20/34* (2012.01)

(52) U.S. Cl.
CPC .... *G06Q 20/4012* (2013.01); *G06K 19/07709* (2013.01); *G06Q 20/341* (2013.01)

(58) Field of Classification Search
USPC ......................................................... 705/44
See application file for complete search history.

(56) References Cited

U.S. PATENT DOCUMENTS

2009/0164373 A1* 6/2009 Blythe .................. G06Q 10/06
  705/44
2010/0058068 A1* 3/2010 Perkins ................. G07F 7/1008
  713/184

(Continued)

FOREIGN PATENT DOCUMENTS

WO WO-2014165974 A1 * 10/2014 ......... G06Q 20/3276

OTHER PUBLICATIONS

Authors: Olawale Adepoju et al: Comparative Evaluation of Credit Card Fraud Detection Using Machine Learning Techniques; Publisher: IEEE; Published in: 2019 Global Conference for Advancement in Technology (GCAT) Date of Conference: Oct. 18-20, 2019; Date Added to IEEE Xplore: Feb. 3, 2020 (Year: 2019).*

(Continued)

*Primary Examiner* — Hani M Kazimi
*Assistant Examiner* — Hatem M Ali
(74) *Attorney, Agent, or Firm* — Ruggiero, McAllister & McMahon LLC

(57) ABSTRACT

A method of facilitating a transaction with a payment card of a cardholder. The method includes receiving a deceptive PIN comprising a set of characters in which one character is a deceptive character. The deceptive character is different than each of a set of actual characters of an actual PIN of the payment card. The method includes identifying the deceptive character and a position of the deceptive character among the set of characters of the deceptive PIN. The method includes determining a reconstructed PIN by replacing the deceptive character with a corresponding actual character at the position in the deceptive PIN. The actual character is determined based on a predefined mathematical expression and a predefined value for the predefined mathematical expression. The method includes authenticating the reconstructed PIN by matching the reconstructed PIN with (Continued)

the actual PIN. The method further includes facilitating the transaction upon successful authentication.

20 Claims, 20 Drawing Sheets

(56) References Cited

U.S. PATENT DOCUMENTS

2011/0055586 A1* 3/2011 Lupton ............... G07F 7/1091
  713/184
2014/0089196 A1* 3/2014 Paya ............... G06Q 20/3827
  705/44

OTHER PUBLICATIONS

Authors: E. Saraswathi et al ; Credit Card Fraud Prediction And Detection using Artificial Neural Network And Self-Organizing Maps; Published in: 2019 3rd International Conference . . . (ICCMC); Date of Conference: Mar. 27-29, 2019 (Year: 2019).*

Authors: Olawale Adepoju et al: Comparative Evaluation of Credit Card Fraud Detection Using Machine Learning Techniques; Publisher:IEEE; Published in:2019 Global Conference for Advancement in Technology (GCAT);Date of Conference: Oct. 18-20, 2019; Date Added to IEEE Xplore: Feb. 3, 2020 (Year:2019) (Year: 2019).*

Authors: E. Saraswathi et al ; Credit Card Fraud Prediction And Detection using Artificial Neural Network And Self-Organizing Maps; Published in: 2019 3rd International Conference . . . (ICCMC); Date of Conference: Mar. 27-29, 2019 (Year: 2019) (Year: 2019).*

* cited by examiner

| KEYPAD INPUTS | KEYPAD OUTPUTS |
| --- | --- |
| 1 | 10 |
| 2 | 9 |
| 3 | 8 |
| 4 | 7 |
| ⋮ | ⋮ |
| ANY NUMBER | HOLD FOR 3 SECONDS BEFORE ENTERING EACH CONSECUTIVE DIGIT |
| COMPLETE | PRESS OK |

PAYMENT METHODS AND SYSTEMS BASED ON A DECEPTIVE PIN OF A PAYMENT CARD

CROSS REFERENCE TO RELATED APPLICATION

The present application claims foreign priority to Singaporean Patent Application No. 10201808244Y filed on Sep. 21, 2018 and having the same title, the entirety of which is incorporated by reference hereby.

TECHNICAL FIELD

The present disclosure relates to payment transactions and, more particularly to, methods and systems for facilitating transactions with a payment card through deceptive PINS that are not actual PINS of the payment card.

BACKGROUND

Digital payments have seen a drastic increase due to ease of usage and also spares customers the hassle of carrying cash in their wallets. Moreover, people prefer the use of payment cards (e.g., credit card, debit card) for financial transactions at point-of-sale terminals of merchant facilities such as, retail establishments, online stores or businesses (e.g., ticket reservation centers) that handle cash or credit transactions. The various banking cards are referred to herein as payment cards.

The ease in use of payment cards for transactions has come with a cost of compromising on security for transactions. One of the most common security threats is theft of personal information such as, Personal Identification Number (PIN) of payment cards. In an example, fraudsters use devices such as, skimmers to capture and record PIN and bank account information of customers. Commonly, cardholders may write down the PIN in a piece of parchment paper or on the payment card itself to remember the PIN. However, when such payment cards fall in hands of fraudsters, the fraudster may swipe the payment card using the appropriate PIN.

In a typical POS transaction involving payment cards, a cardholder reaches a POS terminal and presents his payment card to an agent at the merchant facility, the agent at the counter or a fraudster posing as a customer waiting for billing may observe the pattern or PIN of the cardholder using the payment card. In another scenario, people stand in a queue to perform a transaction at an Automated Teller Machine (ATM) kiosk and the cardholder may not have privacy while providing PIN for authenticating the transaction as other people in the queue may keep peeping to either note a status of the transaction or a fraudster may peek in to observe the PIN provided by the cardholder. In such cases, the payment card can be easily misused without the cardholder's knowledge and control. Although, financial institutions that provide banking cards have upgraded the security measures and adopted various measures to safeguard personal information of payment cards for reducing fraud, such as installation of surveillance cameras and remote monitoring, defaulters find alternate ways to retrieving personal information of the customer while transacting at point of sale terminals or at online stores.

In view of the above discussion, there appears a need for a technique to protect the personal information, such as, the PIN associated with the payment card of the cardholder during a transaction at the merchant terminal.

SUMMARY

Various embodiments of the present disclosure provide methods and systems for facilitating a transaction with a payment card of a cardholder without using the actual PIN of the payment card.

In an embodiment, a method of facilitating a transaction with a payment card of a cardholder, is disclosed. The method includes receiving, by a server system associated with a payment network, a deceptive PIN includes a set of characters in which one character is a deceptive character. The deceptive character being different than each of a set of actual characters of an actual PIN of the payment card. The method includes identifying, by the server system, the deceptive character and a position of the deceptive character among the set of characters of the deceptive PIN. The method includes determining, by the server system, a reconstructed PIN by replacing the deceptive character with a corresponding actual character at the position in the deceptive PIN. The actual character is determined based at least on a predefined mathematical expression and a predefined value for the predefined mathematical expression. The method includes authenticating, by the server system, the reconstructed PIN by comparing with the actual PIN. The method further includes upon successful authentication, facilitating, by the server system, the transaction.

In another embodiment, a server system for facilitating a transaction with a payment card of a cardholder is disclosed. The server system includes a memory configured to store instructions and at least one processor configured to execute the stored instructions to cause the server system to perform the method. The method includes receiving, by a server system associated with a payment network, a deceptive PIN includes a set of characters in which one character is a deceptive character. The deceptive character being different than each of a set of actual characters of an actual PIN of the payment card. The method includes identifying, by the server system, the deceptive character and a position of the deceptive character among the set of characters of the deceptive PIN. The method includes determining, by the server system, a reconstructed PIN by replacing the deceptive character with a corresponding actual character at the position in the deceptive PIN. The actual character is determined based at least on a predefined mathematical expression and a predefined value for the predefined mathematical expression. The method includes authenticating, by the server system, the reconstructed PIN by comparing with the actual PIN. The method further includes upon successful authentication, facilitating, by the server system, the transaction.

In yet another embodiment, a method for facilitating a transaction with a payment card of a cardholder is disclosed. The method includes receiving, by a server system associated with a payment network, a deceptive PIN for performing a transaction using a payment card of a cardholder. The deceptive PIN includes a set of characters in which one character is a deceptive character. The deceptive character is different than each of a set of actual characters of an actual PIN of the payment card. The method includes identifying, by the server system, the deceptive character and a position of the deceptive character among the set of characters of the deceptive PIN. The method also includes determining, by the server system, a validity of the transaction by performing at least (1) accessing a primary deceptive character and a primary position of the primary deceptive character in a preceding transaction, wherein the preceding transaction is a last transaction immediately prior to the transaction; (2) comparing the primary deceptive character with the deceptive character and the primary position of the primary deceptive character with the position of the deceptive character; and (3) upon determining the primary deceptive character to be same as the deceptive character and the primary position of the primary deceptive character to be same as the position of the deceptive character, declining the transaction. The method also includes determining, by the server system, a reconstructed PIN by replacing the deceptive character with a corresponding actual character at the position in the deceptive PIN. The actual character is determined based on a predefined value, a predefined mathematical expression and a subset of characters of the set of characters. The method includes authenticating, by the server system, the reconstructed PIN by matching the reconstructed PIN with the actual PIN. The method further includes upon successful authentication, facilitating, by the server system, the transaction.

Other aspects and example embodiments are provided in the drawings and the detailed description that follows.

BRIEF DESCRIPTION OF THE FIGURES

For a more complete understanding of example embodiments of the present technology, reference is now made to the following descriptions taken in connection with the accompanying drawings in which:

FIG. 3B is an example representation of a table displaying customized keypad settings maintained at a database associated with a payment server, in accordance with an example embodiment;

Figure 1:
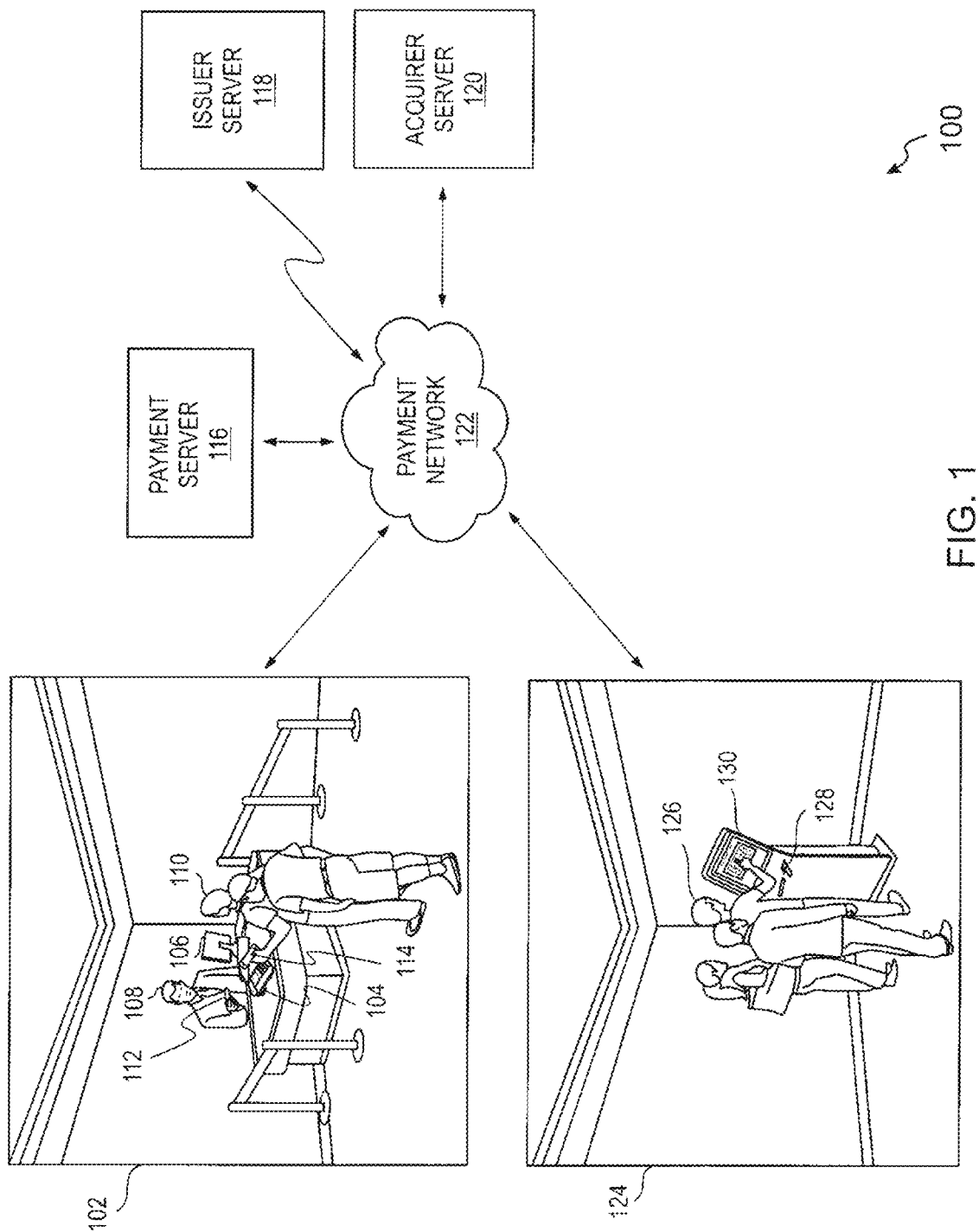
FIG. 1 illustrates an example representation of an environment, in which at least some example embodiments of the present disclosure can be implemented.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The term "issuer account" used throughout the description refers to a financial account that is used to fund the financial transaction (interchangeably referred to as "payment transaction"). Further, the term "acquirer account" used throughout the description refers to a financial account of a merchant or any entity which receives the fund from the issuer account. Examples of the issuer account and the acquirer account include, but are not limited to a savings account, a credit account, a checking account, digital wallet, and a virtual payment account. Each of the issuer account and the acquirer account may be associated with an entity such as an individual person, a family, a commercial entity, a company, a corporation, a governmental entity, a non-profit organization and the like. In some scenarios, an issuer or acquirer account may be a virtual or temporary payment account that can be mapped or linked to a primary payment account, such as those accounts managed by PayPal®, and the like.

The term "payment card", used throughout the description, refers to a physical or virtual card linked with a financial or payment account that may be presented to a merchant or any such facility in order to fund a financial transaction via the associated payment account. Examples of the payment card include, but are not limited to, debit cards, credit cards, prepaid cards, digital wallet, virtual payment numbers, virtual card numbers, forex card, charge cards and stored-value cards. A payment card may be a physical card that may be presented to the merchant for funding the payment. Alternatively or additionally, the payment card may be embodied in form of data stored in a user device, where the data is associated with payment account such that the data can be used to process the financial transaction between the payment account and a merchant's financial account.

The term "payment network", used throughout the description, refers to a network or collection of systems used for transfer of funds through use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, financial accounts, etc. Examples of networks or systems configured to perform as payment networks include those operated by MasterCard®, VISA®, Discover®, American Express®, etc.

Overview

In an example scenario, a cardholder may offer to pay for goods purchased at a merchant facility using a payment card. The cardholder presents his payment card to an agent at a merchant terminal for initiating a transaction. In an example, a fraudster waiting for billing in a queue and posing as a customer beside the cardholder may observe a PIN of the cardholder when the cardholder provides the PIN associated with the payment card at the merchant terminal. The fraudster may steal the payment card and misuse the funds in the payment card without the authorization of the cardholder. Such scenarios where the PIN of the cardholder is at risk of being compromised are addressed by various embodiments of the present disclosure described herein.

Various example embodiments of the present disclosure provide methods, systems, user devices and computer program products for facilitating a transaction at a merchant terminal or at an Automated Teller Machine (ATM), using a deceptive PIN of a payment card of the cardholder, where the deceptive PIN is different than an actual PIN of the payment card. Transaction is processed upon successful verification of the deceptive PIN. Some embodiments further provide a payment card comprising an electronic number pad that can be used for providing the deceptive PIN for the purposes of transaction. Various embodiments further provide methods and systems for customization and registration of customized keypad settings of the payment card. More specifically, techniques disclosed herein enable linking of a deceptive character with the payment card of the cardholder and use of the deceptive character that differs in one character from a corresponding actual character of an actual PIN for the payment card during transaction. In some examples, there may be more than one deceptive character included in the deceptive PIN, for example, two characters of the deceptive PIN may be different as compared to the actual PIN.

In at least one example embodiment, the present disclosure provides a method for registration of a payment card to use the deceptive PIN along with the payment card of the cardholder during transactions. The deceptive PIN includes a set of characters in which one character is a deceptive character. The deceptive character differs from each of a set of actual characters of an actual pin of the payment card. For example, the cardholder may select the deceptive character such that the deceptive character is any of a character other than the set of actual characters in the actual PIN and registers the deceptive character with a server system. Additionally, the cardholder also registers a predefined mathematical expression and a predefined value as a resultant value of the mathematical expression with the server system. The predefined value is obtained when the predefined mathematical expression is applied on the set of actual characters of the actual PIN. In at least one example embodiment, the payment card includes an electronic number pad. The cardholder may register the deceptive character using the electronic number pad. Moreover, the server system allows the cardholder to customize the settings of the electronic number pad and register the customized settings of the electronic number pad.

In an embodiment, the cardholder may offer to pay for goods/services using the payment card. When an agent at a merchant facility swipes the payment card of the cardholder at the merchant terminal for initiating a transaction request, a prompt for providing PIN may be displayed at the merchant terminal. In another embodiment, the cardholder may initiate a transaction for withdrawing cash from a cardholder account of the cardholder at an ATM kiosk by inserting the payment card in a card reader slot of the ATM kiosk that initiates the transaction request. The ATM kiosk may then display a prompt requesting the cardholder to authenticate the transaction by providing a PIN. The cardholder provides a deceptive PIN for performing the transaction at the merchant terminal/ATM kiosk. For example, the cardholder replaces an actual character at a position of the actual PIN with a deceptive character for which he/she registered with the server system. Upon swiping the payment card and providing the deceptive PIN, the server system receives the transaction request. The server system identifies the deceptive character and a position of the deceptive character among the set of characters of the deceptive pin based on the registration.

The server system uses the predefined mathematical expression and the predefined value to determine the actual character corresponding to the deceptive character at the position. The server system replaces the deceptive character with the corresponding actual character and facilitates verification of the deceptive PIN by comparing with a stored PIN. Upon successful verification of the deceptive PIN, the server system then facilitates the transaction from an issuer account of the cardholder to a merchant account/acquirer account.

Various example embodiments of present invention are described hereinafter with reference to FIGS. 1 to 15. An environment for facilitating a transaction with a payment card of a cardholder is explained in detail with reference to FIG. 1.

FIG. 1 illustrates an exemplary representation of an environment 100, in which at least some example embodiments of the present disclosure can be implemented. The environment 100 is exemplarily shown as a merchant facility 102 (also referred to herein as 'a merchant 102') equipped with a merchant terminal 104 (also referred to as 'a POS terminal 104') and a merchant interface device 106. Examples of the merchant 102 may include any retail establishments such as, restaurant, supermarket or business establishments such as, government and/or private agencies, toll gates, parking lot or any such place equipped with POS terminals, such as the merchant terminal 104 where customers visit for performing financial transaction in exchange for any goods and/or services or any transaction that requires financial transaction between customers and a merchant. In various embodiments, the merchant interface device 106 can be a telephone or a computer system operated by an agent 108 for performing payment transactions on behalf of a customer, for example, a cardholder 110. As seen in FIG. 1, the merchant interface device 106 is a computer system operated by the agent 108. It shall be noted that herein the merchant terminal 104 refers to a POS machine which is used to swipe payment cards and not the entire setup including, cash drawers, printers and barcode scanners.

The environment 100 also exemplarily depicts an ATM center 124 which cardholders, for example, a cardholder 126 visits to perform transactions such as, withdrawal of cash from a cardholder account, transfer of cash to another cardholder account or for depositing cash to the cardholder account/another cardholder account of the cardholder via an ATM kiosk 130. The cardholder 126 may insert a payment card 128 in a card reader slot of the ATM kiosk 130 that may read details of the payment card 128 for initiating the transaction. It shall be noted that hereinafter, registration for use of a deceptive character in a deceptive PIN and processing of the transaction using the deceptive PIN have been explained with reference to the cardholder 110 and the same process can be employed by the cardholder 126 and it has not been explained in detail for the sake of brevity.

In at least one example embodiment, a payment server 116 facilitates a web or a mobile application interface (also referred to as an 'application interface') for enabling registration of a deceptive character to be used in a deceptive PIN while performing transactions using a payment card 112 of the cardholder 110/cardholder 126. The application interface may be provided by the payment server 116. The cardholder 110/cardholder 126 registers a deceptive character that he/she may use in transactions, thereby constituting a deceptive PIN. The deceptive PIN comprises a set of characters that includes the deceptive character. The deceptive character differs from a set of actual characters of the actual PIN.

In one embodiment, the cardholder 110 may access the application interface, for placing a registration request via a device 114 associated with the cardholder 110. Examples of the device 114 include, but are not limited to, a personal computer (PC), a tablet device, a personal digital assistant (PDA), a smartphone and a laptop. The device 114 may include physical keypads or may be configured to present a virtual keypad overlay on a display screen of the device 114. The registered information is stored in a database associated with the payment server 116. During a transaction, the payment server 116 facilitates verification of the PIN received from the cardholder 110 by comparison with the registered PIN stored in the payment server 116. In an example scenario, where a deceptive PIN has been used by the cardholder 110, the payment server 116 identifies the deceptive character in the deceptive PIN and replaces the deceptive character with an actual character corresponding to the actual PIN. The payment server 116 is described in detail with reference to FIG. 14.

The registration request includes a deceptive character that may be used in the deceptive PIN while performing transactions using the payment card 112, a predefined mathematical expression and a predefined value. The predefined mathematical expression and the predefined value may be used by the payment server 116 to determine an actual character corresponding to the deceptive character in the deceptive PIN. It shall be noted that the deceptive character is any of a character other than the set of actual characters of an actual PIN. For example, an actual PIN ("5234") of the payment card 112 of the cardholder 110 comprises a set of actual characters as '5', '2', '3', '4'. The cardholder 110 can choose a deceptive character from characters such as, '0', '1', '6', '7', '8', '9' and register the character (e.g., character '9') with the payment server 116. The deceptive character is replaced by the actual character to reconstruct the actual PIN for facilitating the transaction using the payment card 112. Accordingly, the application interface is configured to acquire cardholder information of the cardholder 110 such as, payment card information of the payment card 112 and facilitate linking of the payment card 112 with the deceptive character. In some example embodiments, the payment server 116 facilitates a notification comprising a successful registration for using the deceptive character with the payment card 112 of the cardholder 110 via the application interface. Accordingly, the deceptive character, predefined mathematical expression and the predefined value are linked with the payment card 112 of the cardholder 110 and stored in a database of the payment server 116.

The payment server 116 is configured to verify the registration request from the cardholder 110. For example, the payment server 116 may authenticate the cardholder 110 prior to registering the deceptive character along with the payment card 112 using one or more authentication techniques such as, a security question, One Time Password (OTP), mobile number verification or biometric access. In at least one example embodiment, the payment server 116 is configured to store the deceptive character, the predefined mathematical expression and the predefined value along with existing customer data of the payment card 112. An example of a UI configured to receive the registration request from the cardholder 110 is shown and explained with reference to FIG. 7.

In at least one example embodiment, the cardholder 110 may use the payment card 112 comprising an electronic number pad. In such cases, the cardholder 110 may register only the predefined mathematical expression and the predefined value. The deceptive character for a transaction may be set by the cardholder 110 on the electronic number pad of the payment card 112 even before performing the transaction. The registration of the deceptive character using the electronic number pad of the payment card 112 has been explained with reference to FIG. 5A. Additionally or optionally, the cardholder 110 can customize electronic number pad settings of the payment card 112 for providing an additional level of security while providing PIN during transactions. The cardholder 110 registers the customization of the electronic number pad settings with the payment server 116.

In an example scenario, the cardholder 110 may purchase goods from the merchant 102 and offer to pay for the goods using the payment card 112. In conventional scenarios, the cardholder 110 would reach the merchant terminal 104 upon his turn and hand over the payment card 112 to the agent 108. The agent 108 may swipe the payment card 112 at the merchant terminal 104 that may display a prompt requesting the cardholder 110 to provide a PIN for authenticating the transaction. The cardholder 110 may provide a deceptive PIN on the merchant terminal 104. For example, the cardholder 110 may provide the deceptive PIN "9234" on the merchant terminal 104. The payment server 116 looks up in a database to identify the deceptive character "9" (registered with the payment card 112) and position (a first position) of the deceptive character in the deceptive PIN. In at least one example embodiment, the payment server 116 determines an actual character corresponding to the deceptive character "9" at the position based on the predefined mathematical expression and the predefined value. For example, the cardholder 110 may provide a mathematical expression "a+b+c+d" (sum of actual characters in the actual PIN) and the predefined value "14" for the mathematical expression as (5+2+3+4=14). Upon identifying the deceptive character "9", the deceptive PIN is "_234" where "_" signifies the deceptive character that is removed and has to be replaced by a corresponding actual character. The payment server 116 determines the corresponding actual character as "5" using the predefined value and the predefined mathematical expression. For instance, the mathematical expression is applied to a subset of characters of the deceptive PIN '2', '3', '4' to define an intermediate expression (a+2+3+4=14). The intermediate expression is solved with the mathematical expression to determine the actual character. For example, a difference between the predefined value "14" and sum of the subset of characters '2', '3', '4' of the deceptive PIN excluding the deceptive character '9' is computed as "5" (14−(2+3+4)=5) that yields the actual character corresponding to the deceptive character that has to replace the deceptive character at the first position. In some examples, there may be more than one deceptive character included in the deceptive PIN, for example, two characters of the deceptive PIN may be different as compared to the actual PIN. In such examples, the deceptive PIN may be 9214 when the actual PIN is 5234, and one or more mathematical expressions may be used to determine the actual characters corresponding to the deceptive characters.

In at least one example embodiment, the payment server 116 replaces the deceptive character and sends a constructed PIN for authentication to an issuer server 118 via a payment network 122. The issuer server 118 verifies the constructed PIN. Upon verification by the issuer server 118, the payment server 116 settles the transaction between the issuer server 118 and an acquirer server 120 via the payment network 122 by transferring a transaction amount from an issuer account of the cardholder 110 to an acquirer account of the merchant 102. Examples of the payment network 122 include, but not limited to, MasterCard® payment system interchange network 122. The MasterCard® payment system interchange network 122 is a proprietary communications standard promulgated by MasterCard International Incorporated® for the exchange of financial transaction data between financial institutions that are members of MasterCard International Incorporated®. (MasterCard is a registered trademark of MasterCard International Incorporated located in Purchase, N.Y.). The payment card system interchange network 122 is hereinafter referred to as the payment network 122.

The issuer server 118 is associated with a financial institution normally called as an "issuer bank" or "issuing bank" or simply "issuer" or simply "bank", in which the cardholder 110 may have an issuer account, which issues one or more payment cards, such as a credit card or a debit card. The payment cards are linked to an issuer account associated with a unique payment account number of the cardholder 110. The cardholder 110 can use any of the payment cards to tender payment for the purchase. The issuer bank is responsible for determining whether a customer's issuer account is in good standing and whether the purchase is covered by the customer's available credit line or account balance. Based on these determinations, the payment transaction associated with the payment transaction request is approved or declined.

The acquirer server 120 is associated with a financial institution normally called as a "merchant bank" or the "acquiring bank" or "acquirer bank" or simply "acquirer", in which the merchant 102 may have a merchant account. The acquirer server 120 is associated with the acquirer bank. Using the payment network 122, the acquirer server 120 will communicate with the issuer server 118 to determine whether the cardholder's account is in good standing and whether the transaction amount of the purchase is covered by the cardholder's available account balance. Based on these determinations, authorization of the transaction is declined or accepted. When the authorization is accepted, the available balance of cardholder's account is decreased.

In some example embodiment, the issuer server 118 may provide services of using the deceptive PIN with the payment card 112 of the cardholder 110. In such cases, the cardholder 110 may place the registration request for the deceptive PIN with the issuer server 118. The issuer server 118 may store details of the deceptive character, the predefined mathematical expression and the predefined value along with payment card details of the cardholder 110. During a transaction, the payment server 116 may forward the transaction request along with the payment card information of the cardholder 110 and the deceptive PIN. The issuer server 118 determines the deceptive character and derives the corresponding actual character and verifies the constructed PIN before authenticating the transaction.

Some non-exhaustive example embodiments of registration for a deceptive PIN and performing a transaction using the deceptive PIN at the merchant terminal 104/ATM kiosk are described with reference to FIGS. 2A-2B to 15.

Figure 2A:
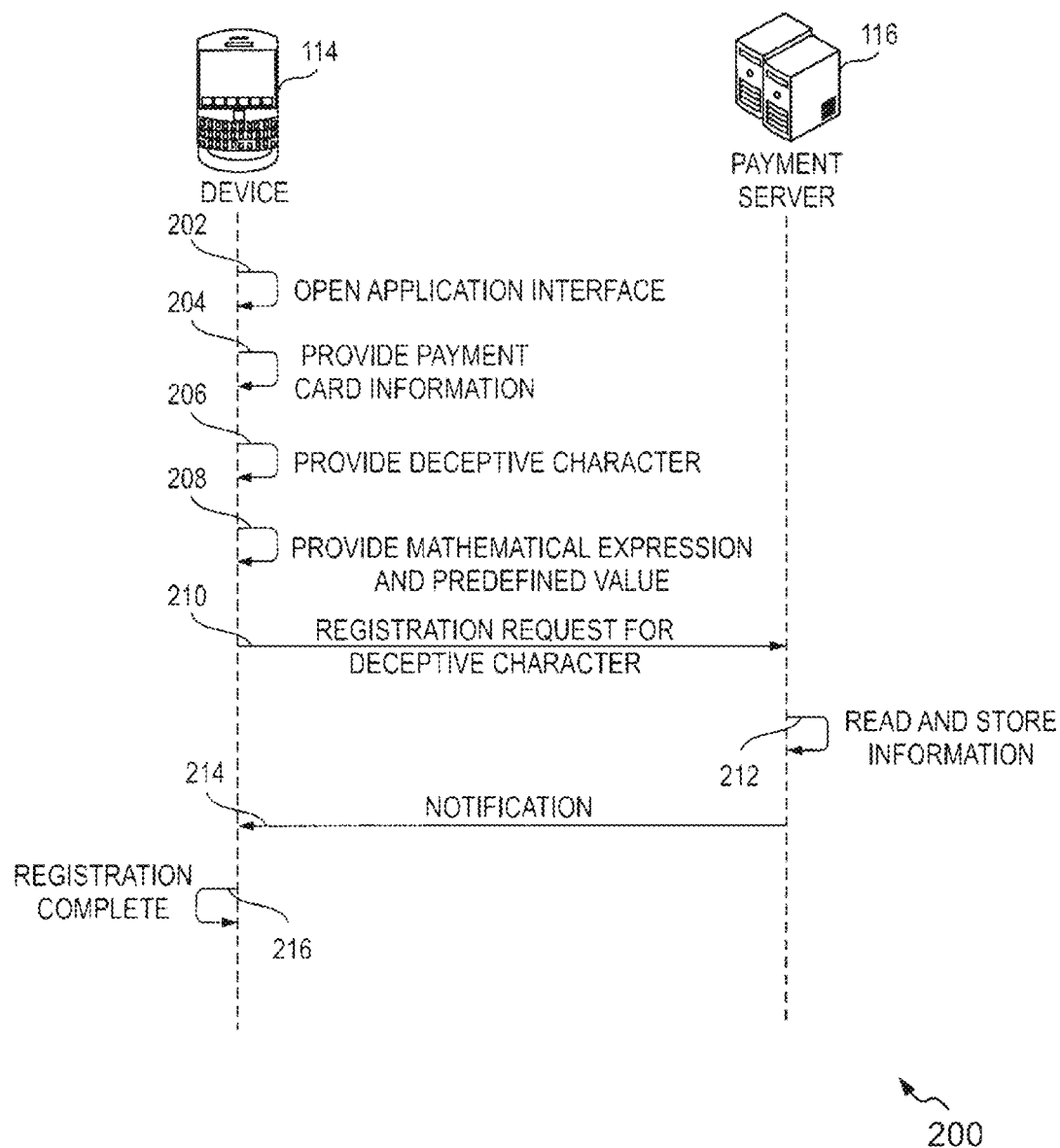
FIG. 2A illustrates a sequence flow diagram representing a method of registration of a deceptive character for use in a deceptive PIN during a transaction, in accordance with an example embodiment.

Referring now to FIG. 2A, a sequence flow diagram representing a method of registration of a deceptive character for use in a deceptive PIN during a transaction is illustrated in accordance with an example embodiment. The cardholder 110 logs in to a web application or a mobile application associated with the payment server 116 on the device 114.

At 202, the cardholder 110 opens an application interface associated with the payment server 116 on the device 114. The application interface may be a web application or mobile application. In an embodiment, the application interface may be downloaded from the payment server 116 and installed on the device 114 therein. In some forms, after downloading of the application interface, an application icon may be displayed to the cardholder 110 on the display screen of the device 114. The cardholder 110 may provide a selection input on the application icon to invoke the application interface. The application interface, after invoking, may present one or more UIs for creating a user account of the cardholder 110. In some example embodiments, the creation of the user account may not be needed, and the user can access the application in a guest mode. The application interface may present a UI (e.g., a UI 700 shown in FIG. 7) for registration of a deceptive character to be used in a deceptive PIN.

At 204, the cardholder 110 provides a payment card information of the payment card 112 on the application interface. For example, the cardholder 110 may provide information such as, payment card type, payment card number, name of the cardholder 110, validity of the payment card 112 and any other credentials requested by the application interface.

At 206, the cardholder 110 provides the deceptive character on the application interface that may be used in the deceptive PIN during transactions. The deceptive PIN includes a set of characters of which one character is the deceptive character. For instance, an actual PIN for the payment card 112 and the deceptive PIN used for the transaction differ by one character i.e. the deceptive character. Further, the deceptive character is different than each of a set of actual characters of the actual pin of the payment card 112. For instance, the cardholder 110 can choose a character that does not exist in a set of actual characters of the actual PIN as the deceptive character. In an example, if the actual PIN for the payment card 112 is "3312" which includes a set of actual characters '3', '1' and '2', the cardholder 110 (or the cardholder 126) can choose any of one character amongst '0', '4', '5', '6', '7', '8', '9' as the deceptive character and register the deceptive character. It shall be noted that the cardholder 110 can change or update the deceptive character as frequently as desired. However, the deceptive character must be registered with the payment server 116 prior to use in the deceptive PIN.

At 208, the cardholder 110 provides a predefined mathematical expression and a predefined value on the application interface. The predefined mathematical expression and the predefined value are used to identify an actual character of the PIN that is replaced by the deceptive character in the deceptive PIN. The predefined mathematical expression may be constructed using any simple mathematical operators. The predefined mathematical expression when used on the set of actual characters of the actual PIN yield the predefined value. For example, the cardholder 110 defines a mathematical expression as "a*b*c*d", where '*' represents multiplication. In this example, the predefined value as "18" (3*3*1*2=18) for the actual PIN of "3312" for his payment card 112. If the cardholder 110 registers for a deceptive PIN and provides a deceptive character "5", the cardholder 110 may use the deceptive character "5" at any position of the actual PIN i.e. in place of any character of the set of actual characters '3', '3', '1', '2'. Assuming, the cardholder 110 provides a deceptive PIN "3512" where the deceptive character "5" replaces an actual character "3". The actual character may be retrieved using the mathematical expression (a*b*c*d) and the predefined value (18). For example, the deceptive character "5" is identified and removed from the deceptive PIN and remaining set of characters in the deceptive PIN constitute a subset of characters. The mathematical expression is applied to the subset of characters and the predefined value to obtain the actual character as follows:

Subset of characters: '3', '1', '2'
Intermediate expression: 3*b*1*2=18 (or) 6b=18
Actual character: 3

It shall be noted that '0' may be not be selected as a deceptive character for mathematical expression that include mathematical operators such as multiplication or division.

At 210, the cardholder 110 sends a registration request for using a deceptive PIN to the payment server 116 via the application interface. The registration request comprises the payment card information of the payment card 112 of the cardholder 110, the deceptive character, the predefined mathematical expression and the predefined value based on the predefined mathematical expression. The registration request for the deceptive PIN provides an option for the cardholder 110 to use the deceptive PIN in which one character (a deceptive character) differs from a corresponding actual character of a set of actual characters of an actual pin for the payment card 112, thereby providing an additional-level of security while using the payment card 112 and preventing theft of personal information such as PIN. An example of an UI for placing the registration request for using a deceptive PIN is shown and explained with reference to FIG. 7.

At 212, the payment server 116 is configured to read the registration request and store the deceptive character, the predefined mathematical expression and the predefined value along with the payment card information of the cardholder 110 in a database associated with the payment server 116.

At 214, the payment server 116 sends a notification to the cardholder 110 of the registration of the deceptive character for use in deceptive PIN along with the payment card 112 during transactions. Additionally, the cardholder 110 may be notified through text messages or emails.

At 216, the registration process is completed. The cardholder 110 can now perform financial transactions at the merchant terminal 104 or any ATM kiosk such as the ATM kiosk 130 using the payment card 112 by providing a deceptive PIN including the deceptive character. An example of performing a transaction at the merchant terminal 104 using the payment card 112 and a deceptive PIN are shown and explained with reference to FIG. 2B.

Figure 2B:
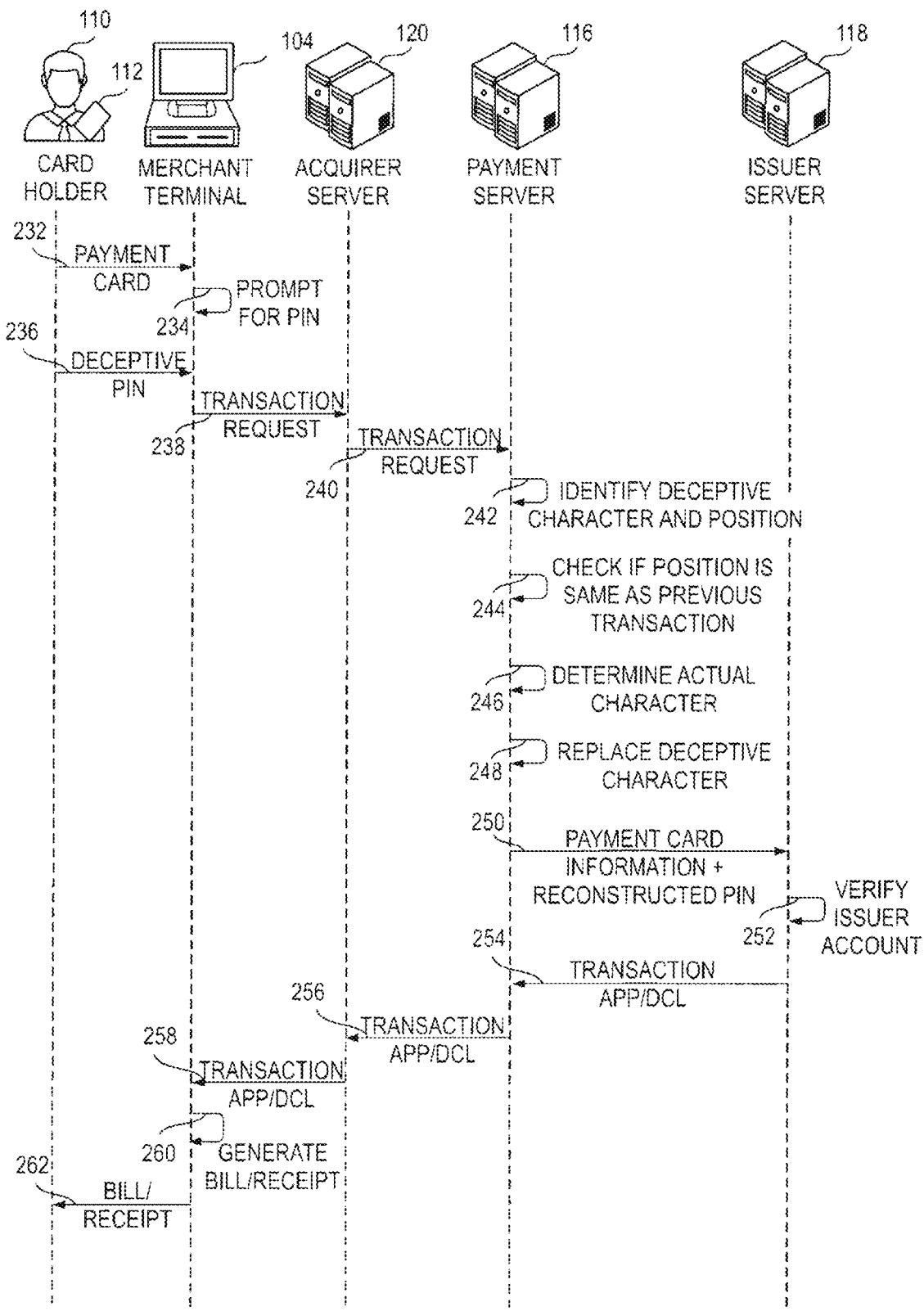
FIG. 2B illustrates a sequence flow diagram representing a method of facilitating a transaction with a payment card of a cardholder and a deceptive PIN at a merchant terminal, in accordance with an example embodiment.

Referring now to FIG. 2B, a sequence flow diagram 230 representing a method of facilitating a transaction with the payment card 112 of the cardholder 110 and a deceptive PIN at the merchant terminal 104 is illustrated in accordance with an example embodiment. The merchant terminal 104 may also be a merchant facilitated e-commerce website interface (online store) running on a computing device, such as, the device 114 associated with the cardholder 110.

At 232, the cardholder 110 offers to pay for the goods purchased with the merchant 102 using the payment card 112. The cardholder 110 hands over the payment card 112 to the agent 108 at the merchant terminal 104. A card reader module in the merchant terminal 104 is configured to read payment card information of the payment card 112 for the transaction. In some example embodiments, if the merchant terminal 104 is an online store, the cardholder 110 may initiate the transaction during check out to pay for the goods in an online cart.

At 234, the merchant terminal 104 displays a prompt requesting the cardholder 110 to provide a PIN for authorizing the transaction using the payment card 112. For example, when the agent 108 swipes the payment card 112 at the merchant terminal 104, the card reader module reads the payment card information and prompts the cardholder 110 to provide the PIN for validating the transaction. In an example scenario, when the cardholder 110 shops in an online store, the merchant facilitated e-commerce website interface, may prompt the cardholder 110 to provide payment card information such as, payment card number, name of the cardholder 110 and the PIN of the payment card 112 for authorizing the transaction.

At 236, the cardholder 110 provides a deceptive PIN on the merchant terminal 104. It shall be noted that neither the merchant terminal 104 nor the agent 108 or any onlooker may decipher that the cardholder 110 is providing the deceptive PIN for the transaction.

At 238, the merchant terminal 104 sends transaction details to the acquirer server 120. The transaction details include the payment card information, the deceptive PIN and a transaction amount among other details such as merchant identifier and merchant account details. At 240, the acquirer server 120 forwards the transaction details to the payment server 116.

At 242, the payment server 116 is configured to identify the deceptive character and a position of the deceptive character in the deceptive PIN. In at least one example embodiment, the cardholder 110 registers the deceptive character to be used in transactions along with the payment card 112 with the payment server 116. Registration of the deceptive character is explained with reference to FIG. 2A. The payment server 116 on receiving the transaction request, checks the PIN provided by the cardholder 110. It shall be noted that the PIN provided by the cardholder 110 in this case is the deceptive PIN. The deceptive PIN comprises a set of characters of which one character (the deceptive character) is different from a set of actual characters of the actual PIN. More specifically, the deceptive character differs from a corresponding actual character in the actual PIN. The payment server 116 looks up in a database associated with the payment server 116 to retrieve details of registration of the deceptive character. The payment server 116 identifies the deceptive character and the position of the deceptive character in the deceptive PIN. For example, the cardholder 110 has registered a deceptive character "6" for the payment card 112 with an actual PIN "2784". The deceptive PIN provided by the cardholder 110 during the transaction is "2684" The payment server identifies the deceptive character as "6" and position as a second position in the set of characters of the deceptive PIN.

At 244, the payment server 116 determines if the position of the deceptive character is same as a primary position of the deceptive character in a previous transaction. In at least one example embodiment, the payment server 116 accesses the primary position of the deceptive character in the previous transaction and compares it with the position in the transaction. For example, the cardholder 110 who registered for the deceptive character "6" has provided a deceptive PIN "2764" for the previous transaction at Walmart® and a deceptive PIN "2684" for the transaction at Target®. In such cases, the deceptive PIN is valid and is further processed to determine an actual character corresponding to the deceptive character for validating the transaction. In an example scenario, if the cardholder 110 provides the deceptive PIN "2764" for the previous transaction at Walmart® and the same deceptive PIN "2764" for the transaction at Target®, this would amount to a fraudster using the deceptive PIN he noticed when the cardholder 110 was performing the previous transaction at the Walmart® and use the same deceptive PIN to perform the transaction at Target®. Accordingly, the payment server 116 is configured to decline the transaction as invalid transaction due to invalid PIN.

At 246, the payment server 116 is configured to determine the actual character corresponding to the deceptive character in the deceptive PIN. A predefined mathematical expression and a predefined value provided by the cardholder 110 for the set of actual characters of the actual PIN while registering for services of a deceptive PIN may be employed to determine the actual character corresponding to the deceptive character. For example, the cardholder 110 defines a mathematical expression as "(a+b)*(c+d)" and the predefined value as "24" ((6+2)*(1+3)=32) for the actual PIN of "6213" for his payment card 112. Assuming, the cardholder 110 registered a deceptive character "5" for use in a deceptive PIN during transactions with the payment server 116. The cardholder 110 may provide a deceptive PIN "6253" during a transaction at the merchant 102. The payment server 116 identifies the deceptive character as "5" and removes the deceptive character from the set of characters of the deceptive PIN to form a subset of characters "623". The predefined mathematical expression is applied on the subset of characters to obtain an intermediate expression as [(6+2)*(c+3)] or 8 (c+3) (or) 8c. The intermediate expression may be equated to the predefined value '32' to determine the actual character as one of the follows [(6+2)*(c+3)]=32 or 8 (c+3)=32 (or) 8c=8. The actual character may be obtained using the predefined value as '1'.

At 248, the deceptive character is replaced by the actual character at the position to generate a reconstructed PIN.

At 250, the payment server 116 sends the payment card information and the reconstructed PIN to the issuer server 118 for verification.

At 252, the issuer server 118 verifies whether the reconstructed PIN received from the payment server 116 is an actual PIN linked to an associated issuer account of the cardholder 110 for which the payment card 112 was issued to the cardholder 110. The issuer server 118 further checks the account balance of the issuer account and if the account balance is enough to accommodate the transaction amount of the transaction. Based on these determinations, a transaction associated with the transaction request may be facilitated.

At 254, the issuer server 118 sends a transaction approval or decline notification/message to the payment server 116. At 256, the payment server 116 sends the transaction approval or decline notification/message to the acquirer server 120. At 258, the acquirer server 120 sends the transaction approval or decline notification/message to the merchant terminal 104.

At 260, the merchant terminal 104 generates a bill or a receipt for transaction. The bill may include the transaction amount, taxes, transaction date, POS ID information, issuer bank name and acquirer bank name, among other information. The bill is printed at the POS terminal 104. At 262, the bill is handed over to the cardholder 110.

Figure 3A:
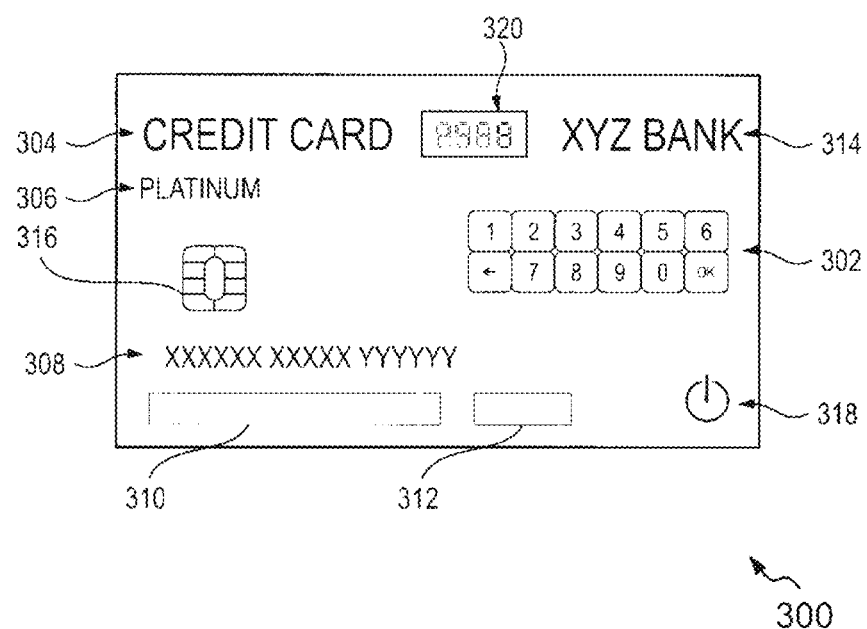
FIG. 3A illustrates an example payment card, in accordance with an example embodiment.

Referring now to FIG. 3A, a payment card 300 including an electronic number pad 302 among other components is shown in accordance with an example embodiment. The electronic number pad 302 as shown in FIG. 3A is a numeric keypad or a number pad and the keys are arranged in two rows. The first row of keys comprises the numbers 1 to 6 and the second row of keys comprises the numbers 7 to 9 and 0. Further, the rightmost key in the second row is depicted as a key associated with text 'ok' and the leftmost key in the second row is depicted as a 'backspace' key. The electronic number pad 302, as an example, can be an electronic keypad comprising a control circuitry that converts key presses into codes. Examples of electronic keypads include optical keypads or capacitive keypads. The electronic number pad 302 can also be a mechanical keypad. The keypad input information is stored in a storage chip 316 present in the payment card 300.

The payment card 300 includes information such as type of card (e.g., credit/debit) 304, type of customer membership (e.g., platinum/gold, etc.) 306, card number 308, name of the cardholder 310, expiry date of the payment card 312, name of issuing bank 314 printed on one surface (shown in FIG. 3A) of the payment card 300. The electronic number pad 302 and the storage chip 316 are also provisioned on the surface of the payment card 300 where the printed information appears. The other surface of the payment card 300 which is not shown in FIG. 3A includes information such as a (Card Verification Value) CVV number and other information as may be already known in the art. The storage chip 316 stores information corresponding to the payment card 300 and the cardholder 110. The payment card 300 includes a display 320 that displays the keypad inputs provided by the cardholder 110.

The storage chip 316 further stores instructions which may correspond to powering ON and powering OFF of the payment card 300, reading of keypad inputs, storing of keypad inputs, erasing of keypad inputs and transferring of keypad inputs to a connected device, etc. As an example, the storage chip 316 may include instructions to temporarily store the keypad input such as the deceptive character until the payment card 300 is swiped or inserted at a merchant terminal (e.g., the merchant terminal 104) for performing transaction. It may be noted that upon transfer of the keypad inputs to a server system via a payment network from the merchant terminal, the keypad inputs may be erased from the storage chip 316.

The payment card 300 may be provisioned with a power supply unit, such as a battery unit or a capacitor and a corresponding power button 318 for powering the electronic number pad 302. The power button 318 is an example of an electronic or a mechanical key similar to the other keys arranged in the electronic number pad 302. The thickness of the power button 318 is same as the thickness of the keypad and conforms to the standard overall thickness of the payment card 300. As an example, the payment card 300 may be so configured that pressing the power button 318 once, for a predefined duration activates the payment card 300 and pressing the power button 318 twice for a predefined duration deactivates or turns OFF the payment card 300.

In yet another embodiment, the payment card 300 may be implemented without the power button 318. Such payment card 300 may be so configured that when the payment card 300 is inserted into a card reader device at the merchant terminal, the electrical components of the payment card 300 are powered ON and a communication module transfers the information in the storage chip 316 to the merchant terminal.

Referring again to FIG. 1, in a scenario where a payment card (such as the payment card 300) is powered ON by the cardholder 110 for providing a deceptive character prior to handing over the payment card 300 to the agent 108 for initiating the transaction. The cardholder 110 may provide a pattern on the electronic number pad 302 for enabling a write mode on the payment card 300, such that information provided via the electronic number pad 302 is stored in the storage chip 316. The cardholder 110 can configure a pattern in the payment card 300 such that pressing a key, for example, '2' twice may enable a write mode for a deceptive character to be stored in the storage chip 316. The cardholder 110 can register a deceptive character on-the-go by powering ON the payment card 300 and providing the pattern followed by the deceptive character. In at least one example embodiment, the display 320 displays the deceptive character provided by the keypad input of the cardholder 110. The cardholder 110 can press the 'ok' key to confirm storing of the deceptive character in the storage chip 316 for future transactions. It shall be noted that the deceptive character stored in the storage chip 316 can be used by the cardholder 110 for every transaction unless the cardholder 110 decides to change the deceptive character. However, it shall be noted that the choice of the deceptive character is limited to selection of a character other than the set of actual characters of an actual PIN of the payment card 300.

In at least one example embodiment, the cardholder 110 may configure and pre-set different deceptive keys for different days of a week. For example, if the actual PIN associated with the payment card 300 is "6215", the cardholder 110 has the option of selecting any of characters, '0', '3', '4', '7', '8', '9' for each day of the week. In an example, the cardholder 110 may assign '0' for Monday, '3' for Tuesday, '4' for Wednesday, '7' for Thursday, '8' for Friday, '9' for Saturday and '8' for Sunday. However, it shall be noted that the position of the deceptive character in the deceptive shall not be same for two consecutive transactions. For example, if the cardholder 110 has selected the deceptive character '9', the cardholder 110 may not be able to use the deceptive character '9' for two different transactions that happen subsequently, for example, a transaction (a previous transaction) using deceptive PIN "6285" at Amazon® followed by a transaction using the deceptive PIN "6285" at Target®.

In an example scenario, the payment card 300 is handed over to the agent 108 at the merchant terminal 104 after storing the deceptive character in the payment card 300. The agent 108 may swipe the payment card 300 or insert the payment card 300 into a card reader module at the merchant terminal 104 that powers ON the payment card 300. Once powered ON, the agent 108/the cardholder 110 can enter the PIN and the transaction amount while the payment card 112 is still inserted at the card reader module of the merchant terminal 104.

It shall be noted that the PIN/deceptive PIN can alternatively be provided through interfaces comprising a physical keypad or a virtual keypad. Such interfaces can be provisioned at the merchant terminal 104 or the merchant interface device 106 or at a device (e.g., the device 114) of the cardholder 110. It will be understood that if the interface comprising the electronic number pad 302 is provisioned on a device (e.g., the device 114), the device may have to be additionally provisioned with one or more additional hardware modules, such as a USB port, NFC, Bluetooth, Wifi, etc., in operative communication with the keypad interface that enable transfer of the keypad input from the device 114 to the merchant terminal 104.

Upon swiping the payment card 112 at the merchant terminal 104, a transaction request is generated and the transaction between the user (issuer account) and the merchant (acquirer account) is facilitated by a server system and the payment network 122. Examples of the server system includes the issuer server 118, the acquirer server 120 and the payment server 116. In some cases, the issuer server 118, the acquirer server 120 and the payment server 116 can be a single entity, or any two of these servers may be a single entity. The transaction request comprises a transaction amount associated with a current purchase of goods and/or services at the merchant facility 102 and a plurality of number pad values indicative of the deceptive character (stored in the storage chip 316) and a set of characters of the deceptive PIN. The transaction request is received by the acquirer server 120 which sends it to the payment server 116 through the payment network 122.

The payment server 116 receives the transaction request and checks the database associated with the payment server 116 to retrieve customized electronic number pad settings for mapping the plurality of number pad values from the second set of positions to a corresponding first set of positions in the electronic number pad 302 based on registration to identify the deceptive character and the deceptive PIN provided by the cardholder 110. In such cases, customized electronic number pad settings, a predefined mathematical expression and a predefined value for identifying an actual character corresponding to the deceptive character are registered with the payment server as explained with reference to FIGS. 4B-4C. The registered information such as, customized electronic number pad settings, the predefined mathematical expression and the predefined value are stored in a database associated with the payment server 116. The payment server 116 retrieves the predefined mathematical expression and the predefined value for identifying an actual character corresponding to the deceptive character in the deceptive PIN. Determination of the actual character corresponding to the deceptive character in the deceptive PIN has been explained with reference to FIG. 5A. The payment server 116 replaces the deceptive character with the actual character determined by the payment server 116 to generate a reconstructed PIN using the predefined mathematical expression and the predefined value. The payment server 116 sends the transaction request with the reconstructed PIN to the issuer server 118 for verification. In some example embodiments, operations of the payment server 116 mentioned above may be performed by the issuer server 118.

FIG. 3B is an example representation of a table 350 displaying electronic number pad settings maintained at a database associated with the payment server 116. As seen in FIG. 3B, the table 350 includes listings of keypad inputs in form of numbers and digits in a first column 352 and user defined keypad outputs in form of numbers and digits in a second column 354. It may be noted that the table 350 may include default keypad settings as set by the manufacturer/issuer of the payment card 300. As described earlier, settings may refer to configuring and assigning new outputs to the keys of the electronic number pad (see, the electronic number pad 302). As an example, in a customized setting as displayed by the table 350, if the cardholder 110 wishes to enter the digit/number '1' through the electronic number pad, the key '10' should be pressed. Likewise, if the cardholder 110 wishes to enter the digit '3' through the electronic number pad, the key '8' should be pressed. Similarly, if the cardholder 110 wishes to enter a number such as '514' through the electronic number pad, the cardholder 110 should press '6' followed by a 1 second hold followed by '10' followed again by a 1 second hold and '7'. It shall be noted that the table 350 shown in FIG. 3B is only exemplary and for the purposes of explanation. In practical, the database associated with the payment server 116 may include multiple such tables with varying settings and each table may have fewer or more columns and rows than depicted in FIG. 3B.

Figure 4A:
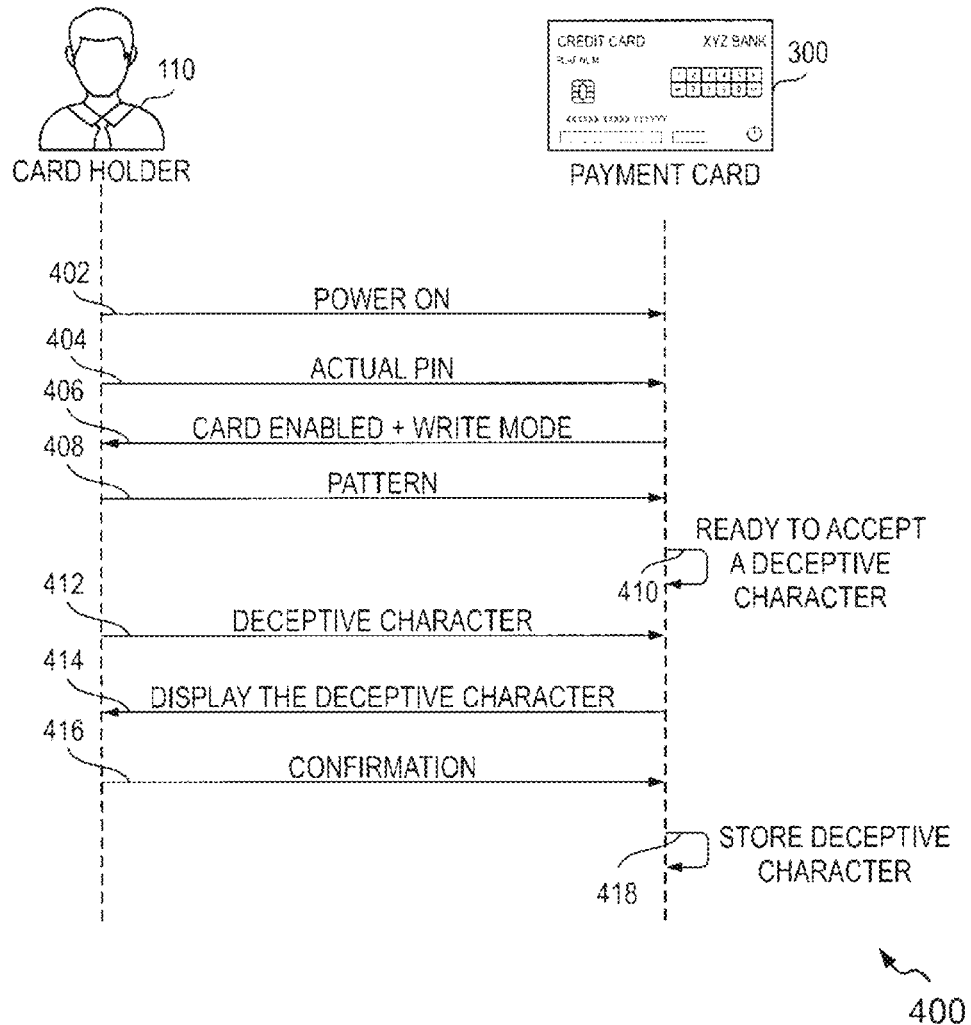
FIG. 4A illustrates a sequence flow diagram representing a method of registration for a deceptive character at a server system for use in a deceptive PIN during a transaction with the payment card of FIG. 3A, in accordance with an example embodiment.

Referring now to FIG. 4A, a sequence flow diagram 400 representing a method of registration for a deceptive character at a server system for use in a deceptive PIN during a transaction with the payment card 300 of FIG. 3A is illustrated in accordance with an example embodiment. An example of the server system may be the payment server 116 or the issuer server 118. The cardholder 110 can pre-set and register the deceptive character at any time. The deceptive character is stored in the storage chip 316 of the payment card 300 and is sent along with every transaction until the cardholder 110 chooses to reset the deceptive character.

At 402, the cardholder 110 powers ON the payment card 300. For example, the cardholder 110 may push the power button 318 of the payment card 300 to power ON the payment card 300. In an example, the cardholder 110 has the option to configure powering ON/OFF of the payment card 300. As an example, the payment card 300 may be configured to power ON when the power button 318 is pressed once for a predefined duration.

At 404, the cardholder 110 provides an actual PIN of the payment card 300 to activate the payment card 300. If the cardholder 110 is unable to provide the actual PIN, access to use the payment card 300 for altering/changing settings may be denied. This ensures that the payment card 300 is not tampered with when it falls in hands of fraudsters who may misuse the payment card 300.

At 406, the payment card 300 is enabled and enters a write mode when the cardholder 110 provides a correct PIN. At 408, the cardholder 110 provides a pattern on the electronic number pad of the payment card 300. In at least one example embodiment, the cardholder 110 may provide a pattern for accepting a deceptive character and storing the same in the storage chip 316. For example, the cardholder 110 may configure the payment card 300 such that pressing and holding a key, such as, character '3' may ensure that the payment card 300 enters the write mode for accepting the deceptive character. In some embodiments, settings may be provided by a manufacturer or factory installed in the payment card 300 and the cardholder 110 may have access to an instruction manual for enabling various options in the payment card 300.

At 410, the payment card 300 is ready to accept a deceptive character from the cardholder 110. At 412, the cardholder 110 provides the deceptive character via the electronic number pad of the payment card 300. The deceptive character may be any character other than a set of actual characters in the actual PIN of the payment card 300. For example, if the actual PIN is "8692", the cardholder 110 can choose any of a character, '0', '1', '3', '4', '5' and '7' as the deceptive character to use as a deceptive character in place of an actual character in the deceptive PIN.

At 414, the payment card 300 displays the deceptive character for the cardholder 110 on the display 320 of the payment card 300. At 416, the cardholder 110 may provide a confirmation on selection of the deceptive character. For example, the cardholder 110 may press the 'ok' key to confirm selection of the deceptive character.

At 418, the payment card 300 stores the deceptive character on the storage chip 316 of the payment card 300.

Figure 4B:
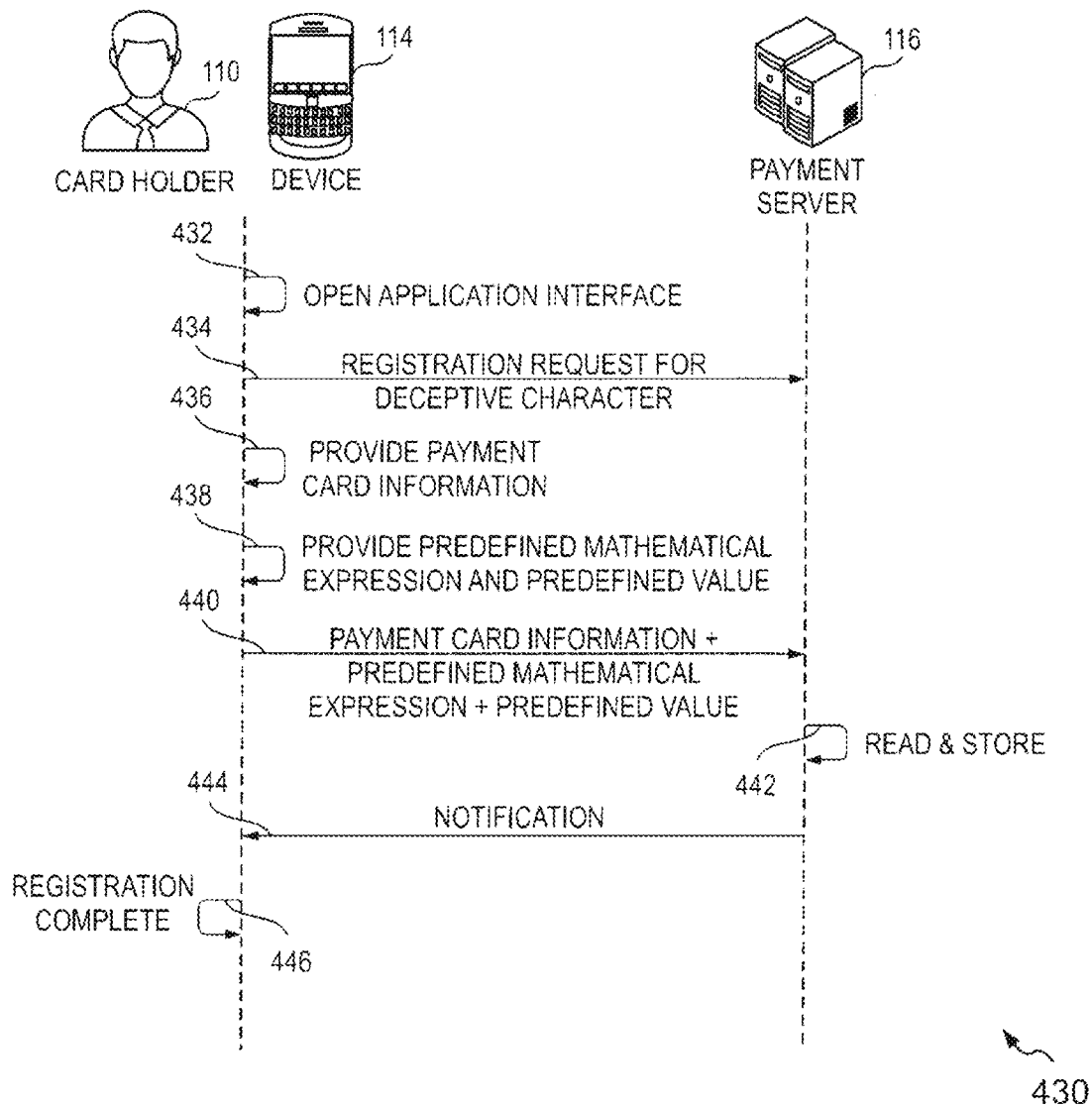
FIG. 4B illustrates a sequence flow diagram representing a method of registration of a predefined formula and a predefined value associated with an actual PIN of the payment card of FIG. 3A, in accordance with an example embodiment.

Referring now to FIG. 4B, a sequence flow diagram 430 representing a method of registration of a predefined formula and a predefined value associated with an actual PIN of the payment card 300 of FIG. 3A is illustrated in accordance with an example embodiment. The predefined formula and the predefined value are registered with a server system such as, the payment server 116 or the issuer server 118. In this example representation, the server system is depicted as the payment server 116 for exemplary purpose only. However, the cardholder 110 may register the predefined formula and the predefined value with the issuer server 118.

At 432, the cardholder 110 opens the application interface associated with the payment server 116 on the device 114.

At 434, the cardholder 110 places a registration request for using a deceptive character in a deceptive PIN for transactions using the payment card 112. For example, the cardholder 110 may access a UI and request registration for using a deceptive PIN during transactions. The payment server 116 may present one or more UIs for completing the registration process.

At 436, the cardholder 110 provides a payment card information of the payment card 112 on the application interface. The one or more UIs presented by the application interface may prompt the cardholder 110 to provide payment card information such as, payment card type, payment card number and name of the cardholder 110 for identifying issuer account of the cardholder 110.

At 438, the cardholder 110 provides a predefined mathematical expression and a predefined value on the application interface. The predefined mathematical expression and the predefined value are used to identify an actual character that has been replaced by the deceptive character in the deceptive PIN.

At 440, the cardholder 110 sends the payment card information of the cardholder 110, the predefined mathematical expression and the predefined value to the payment server 116 via the application interface. At 442, the payment server 116 is configured to read and store the payment card information of the cardholder 110, the predefined mathematical expression and the predefined value in a database associated with the payment server 116.

At 444, the payment server 116 sends a notification to the cardholder 110 of the registration of the predefined mathematical expression and the predefined value for use of the deceptive PIN along with the payment card 112 during transactions. Additionally, the cardholder 110 may be notified through text messages or emails.

At 446, the registration process is completed. The cardholder 110 can now perform financial transactions at the merchant terminal 104/ATM kiosk 130 using the payment card 300 by providing a deceptive PIN including a deceptive character. It shall be noted that the cardholder 110 may have to register the deceptive character for use in the deceptive PIN via the payment card 300. An example of performing a transaction at the merchant terminal 104 using the payment card 112 and a deceptive PIN is shown and explained with reference to FIG. 5A.

In some embodiments, the electronic number pad of the payment card 300 may be customized for providing an additional level of security for PIN based transactions performed at any merchant facility. A method of customizing the electronic number pad of the payment card 300 is explained with reference to FIG. 4C.

Figure 4C:
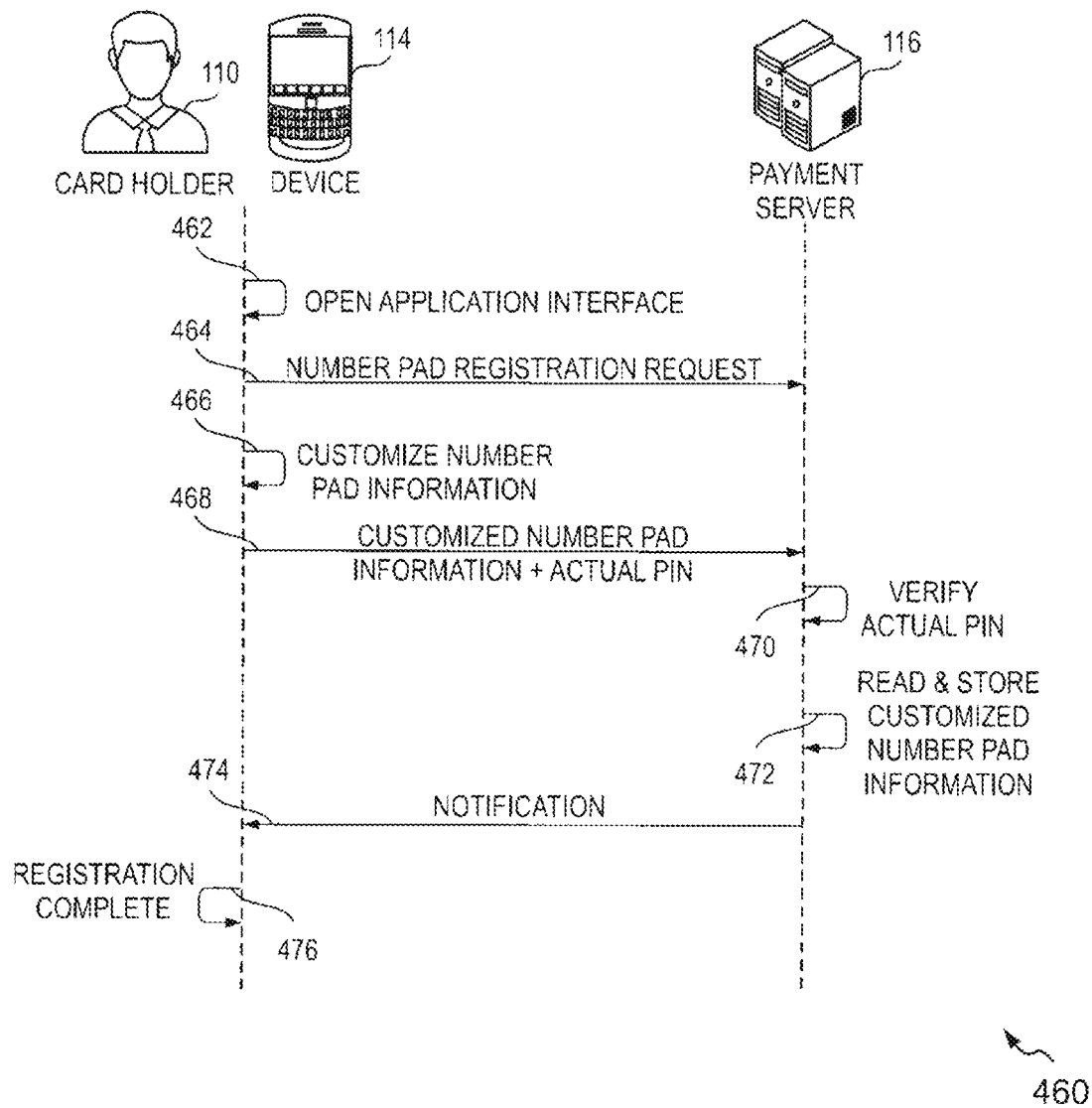
FIG. 4C illustrates a sequence flow diagram representing a method of registration of the customized keypad settings of the payment card of FIG. 3A at a server system, in accordance with an example embodiment.

FIG. 4C is a simplified schematic flow diagram 460 representing a method of registration of customized electronic number pad settings at the payment server 116, in accordance with an example embodiment. The cardholder 110 logs in to a web application or a mobile application, for example the application interface associated with the payment server 116 on the device 114.

At 462, the cardholder 110 opens the application interface associated with the payment server 116 on the device 114. In an embodiment, the application interface may be downloaded from the payment server 116 and installed on the device 114 therein. The device 114 may include physical keypads or may be configured to present a virtual keypad overlay on the screen of the device 114. Additionally, the keypad may be a peripheral input device coupled/connected to the device 114.

At 464, the payment server 116 receives a number pad registration request to register customized electronic number pad settings through the application interface. The application interface may present an interface comprising actionable icons (not shown) to enable generation of the request by the cardholder 110 to customize electronic number pad settings and register the customized electronic number pad settings to be applied in future transactions. It shall be noted that the payment card 300 may already have a default keypad setting provided by either the manufacturer or issuer issuing the payment card 300 to the cardholder 110. The payment card 300 can be used with the default settings. However, customization may be recommended for additional security.

At 466, the cardholder 110 customizes the electronic number pad setting (e.g., customizes key/number pad information) inputs using the keypad associated with the device 114. Herein, settings may refer to configuring and assigning new outputs to key inputs of the electronic number pad by mapping first set of positions of each character (key input) in the electronic number pad to a second set of positions in the electronic number pad. It shall be noted that the first set of positions correspond to actual positions of each of the characters (key inputs). As an example, in a default setting a key '1' may be pressed to achieve an output 1. However, in a customized setting, a key '1' may be customized to provide an output '6' and so on. An example of customization of the electronic number pad is show and explained with reference to FIG. 3B.

At 468, the customized electronic number pad settings (e.g., customized number pad information) and the actual PIN of the payment card 300 are sent to the payment server 116 by the application interface via the payment network 122. At 470, the payment server 116 verifies the actual PIN of the payment card 300.

At 472, the payment server 116 reads and stores the customized number pad information in a database associated with the payment server 116.

At 474, the cardholder 110 is notified of the registration of the electronic number pad settings in the application interface. Additionally, the cardholder 110 may be notified through text messages or emails. At 476, the registration process is completed. The cardholder 110 can now perform financial transactions at the merchant terminal 104 by providing keypad inputs in the payment card 300.

Figure 5A:
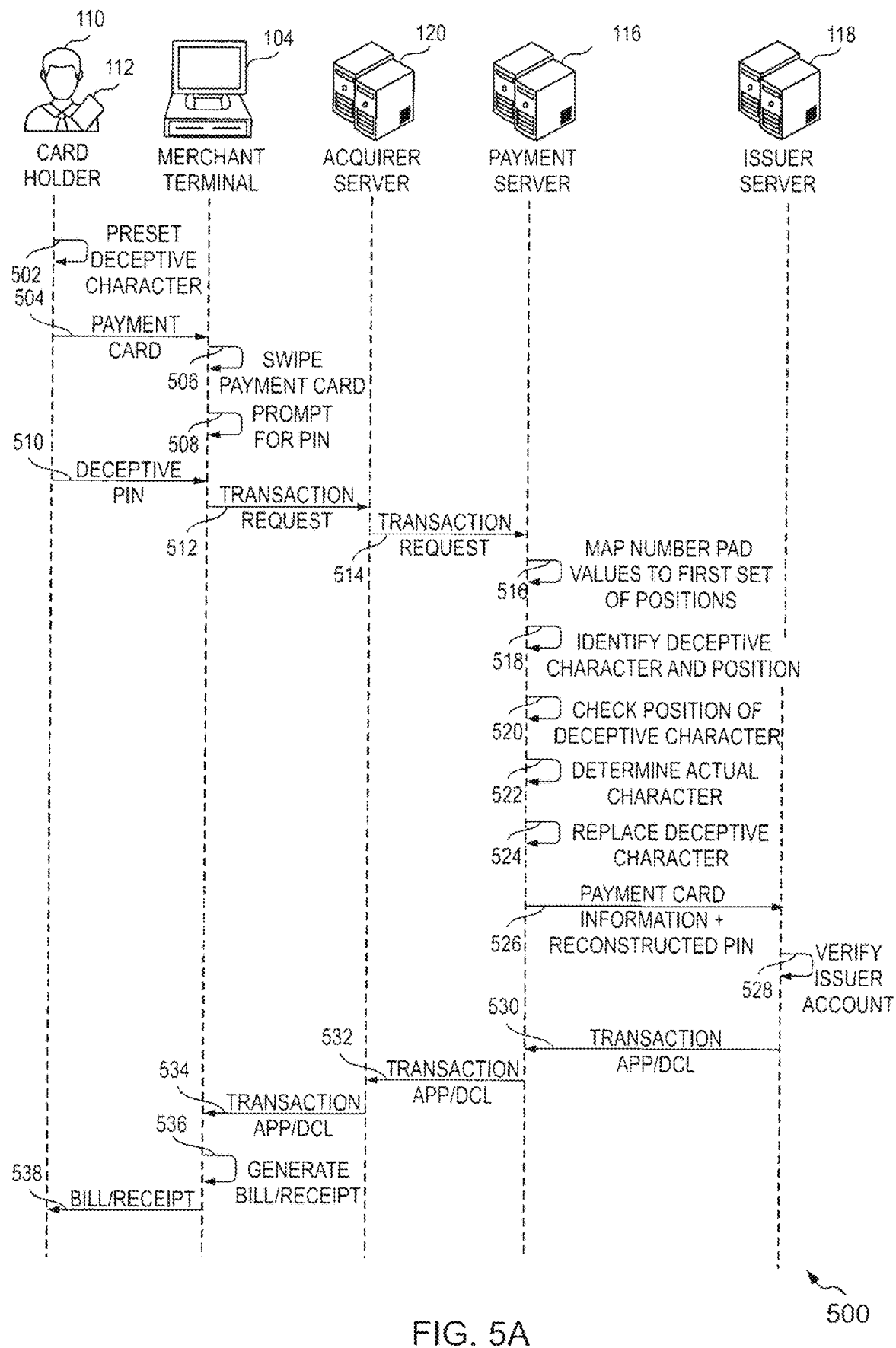
FIG. 5A illustrates a sequence flow diagram representing a method of facilitating a transaction with the payment card of FIG. 3A of the cardholder at a merchant terminal, in accordance with an example embodiment.

Referring now to FIG. 5A, a sequence flow diagram 500 representing a method of facilitating a transaction with the payment card 300 of FIG. 3A of the cardholder 110 at the merchant terminal 104 is illustrated in accordance with an example embodiment. As an example, the cardholder 110 has made a purchase at the merchant facility 102 and is waiting at the merchant terminal 104 for his turn to pay for the goods he/she has purchased.

At 502, the cardholder 110 pre-sets the deceptive character in the payment card 300. The cardholder 110 powers ON the payment card 300 using one of the techniques as described previously and provides a keypad input indicative of the deceptive character through the electronic number pad 302 provided in the payment card 300. The keypad input is stored in the storage chip 316 of the payment card 300.

At 504, the cardholder 110 hands over the payment card 300 to the agent 108 at a billing counter (the merchant terminal 104) in the merchant facility 102. At 506, the agent 108 may swipe the payment card 300 at the merchant terminal 104.

At 508, the merchant terminal 104 displays a prompt requesting the cardholder 110 to provide a PIN for authenticating a transaction using the payment card 300. At 510, the cardholder 110 provides a deceptive PIN on the merchant terminal 104. The deceptive PIN includes a deceptive character in place of a corresponding actual character of the actual PIN. In some embodiments, the cardholder 110 may provide the deceptive PIN via the electronic number pad 302 of the payment card 300. In such cases, the deceptive character and the set of characters of the deceptive PIN are referred to as plurality of number pad values. Assuming the cardholder 110 has registered customized number pad settings of the electronic number pad 302 of the payment card 300 with the payment server 116 by mapping first set of positions of characters (e.g., '0', '1', '2', '3', ... ) to second set of positions in the electronic number pad 302. In an example, '0' has been mapped to '9', '1' has been mapped to '8', '2' has been mapped to '7', '3' has been mapped to '6', '4' has been mapped to '5', '5' has been mapped to '4', '6' has been mapped to '3', '7' has been mapped to '2' and '8' has been mapped to '1' and '9' has been mapped to '0'. For instance, the actual PIN for the payment card 300 is "2968" and the cardholder 110 chooses a deceptive character '4'. The cardholder 110 keys in the deceptive character as '5' (keypad equivalent input for '4') in the electronic number pad 302 of the payment card 300 prior to handing over the payment card 300 to the agent 108. Further, the cardholder 110 may provide keypad inputs '7', '5', '3', '1' on the electronic number pad 302 of the payment card 300 which are equivalents of the set of characters of the deceptive PIN '2', '4', '6', '8' at the merchant terminal 104 where the deceptive character '4' replaces an actual character '9' of the actual PIN "2968". The plurality of number pad values are received from the card reader module of the merchant terminal 104 that reads the payment card 300. It shall be noted that the merchant terminal 104 does not recognize the deceptive PIN and processes the deceptive PIN like any other PIN.

At 512, the merchant terminal 104 generates a transaction request for the acquirer server 120. The transaction request includes the payment card information, the deceptive PIN and the plurality of number pad values of the payment card 300. At 514, the acquirer server 120 forwards the transaction request to the payment server 116.

At 516, the payment server 116 retrieves customized electronic number pad settings from an associated database and maps the plurality of number pad values from a second set of positions to a corresponding first set of positions. For example, the plurality of number pad values are processed to identify the deceptive character and the deceptive PIN. The deceptive character and the deceptive PIN are identified by mapping the number pad values from the second set of positions indicated by '5', '7', '5', '3', '1' to the first set of positions based on the customized number pad settings. In this example, '5' is mapped to '4' which indicates the deceptive character, '7' is mapped to '2', '5' is mapped to '4', '3' is mapped to '6' and '1' is mapped to '8' to construct the deceptive PIN as "2468" where '4' is the deceptive character.

At 518, the payment server 116 identifies the deceptive character and a position of the deceptive character in the deceptive PIN. At 520, the payment server 116 checks if the deceptive character and position of the deceptive character during a current transaction are same as a primary deceptive character and a primary position in a previous transaction. The current transaction is declined if the deceptive character is identical to the primary deceptive character and if the position and the primary position of the primary deceptive character are same for two consecutive transactions. At 522, the actual character corresponding to the deceptive character in the deceptive PIN is determined by the payment server 116. The payment server 116 uses the predefined mathematical expression and the predefined value provided by the cardholder 110 during registration to determine the actual character corresponding to the deceptive character.

At 524, the payment server 116 replaces the deceptive character in the deceptive PIN with the actual character to generate a reconstructed PIN. At 526, the payment card information of the cardholder 110 and the reconstructed PIN are sent to the issuer server 118 for verification.

At 528, the issuer server 118 verifies an issuer account of the cardholder 110. The issuer server 118 verifies whether the constructed PIN received from the payment server 116 is an actual PIN linked to an associated issuer account of the cardholder 110 for which the payment card 112 was issued to the cardholder 110. The issuer server 118 further checks the account balance of the issuer account and if the account balance is enough to accommodate the transaction amount of the transaction. Based on these determinations, a transaction associated with the transaction request may be facilitated.

At 530, the issuer server 118 sends a transaction approval or decline notification/message to the payment server 116. At 532, the payment server 116 sends the transaction approval or decline notification/message to the acquirer server 120. At 534, the acquirer server 120 sends the transaction approval or decline notification/message to the merchant terminal 104.

At 536, the merchant terminal 104 generates a bill or a receipt for transaction. The bill may include the transaction amount, taxes, transaction date, POS ID information, issuer bank name and acquirer bank name, among other information. The bill is printed at the POS terminal 104. At 538, the bill is handed over to the cardholder 110.

Figure 5B:
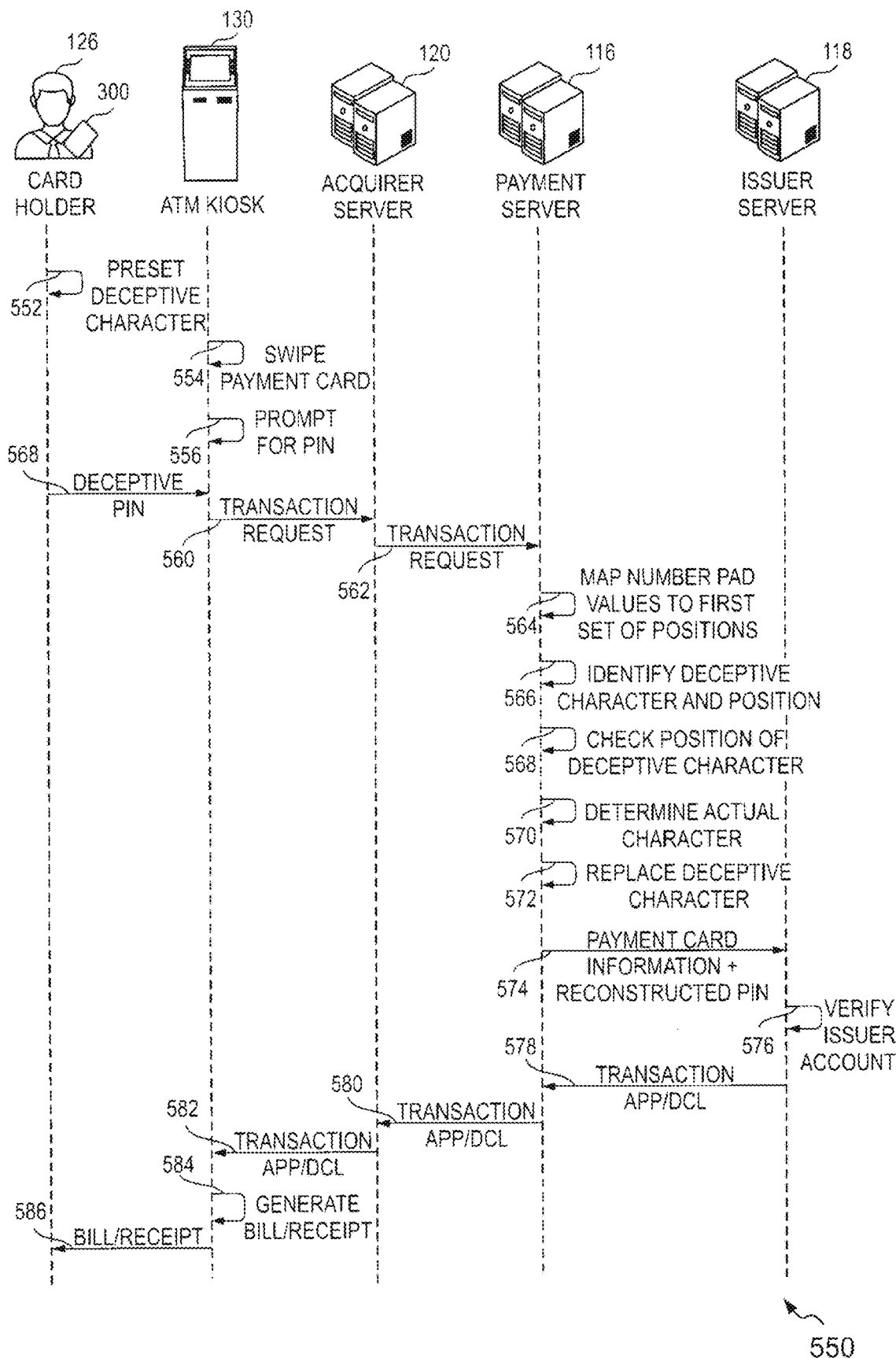
FIG. 5B illustrates a sequence flow diagram representing a method of facilitating a transaction with the payment card of FIG. 3A of the cardholder at a ATM kiosk, in accordance with an example embodiment.

Referring now to FIG. 5B, a sequence flow diagram 550 representing a method of facilitating a transaction with the payment card 300 of FIG. 3A of the cardholder 126 at the ATM kiosk 130 is illustrated in accordance with an example embodiment. In this example representation, the cardholder 126 performs a transaction at the ATM kiosk 130 of an acquirer bank that is different from an issuer bank that issued the payment card 300 to the cardholder 126.

At 552, the cardholder 126 pre-sets the deceptive character in the payment card 300. The cardholder 126 employs techniques as explained with reference to FIG. 4A to pre-set and store the deceptive character in the storage chip 316 of the payment card 300.

At 554, the cardholder 126 inserts/swipes the payment card 300 in a card reader module at the ATM kiosk 130. At 556, a display of the ATM kiosk 130 displays a prompt requesting the cardholder 126 to provide a PIN for authenticating a transaction using the payment card 300.

At 558, the cardholder 126 provides a deceptive PIN via an input interface of the ATM kiosk 130. The deceptive PIN includes the deceptive character that the cardholder 126 pre-set on the electronic number pad of the payment card 300. At 560, the ATM kiosk 130 generates a transaction request for the acquirer server 120. The transaction request includes the payment card information, the deceptive PIN and the plurality of number pad values of the payment card 300. In this example, the plurality of number pad values refers to a pattern provided by the cardholder 126 prior to setting the deceptive PIN and the deceptive PIN. For example, the cardholder 126 presses and hold a character, '3' for 2 seconds followed by a character '1' for 2 seconds to enable the storage chip 316 to write the deceptive character, for example, '4'. The pattern of providing the keypad inputs '3', '1' and the deceptive character '4' is referred to as the plurality of number pad values.

At 562, the acquirer server 120 forwards the transaction request to the payment server 116. At 564, the payment server 116 retrieves the customized electronic number pad settings from an associated database and maps the plurality of number pad values corresponding to a second set of positions to a first set of positions.

At 566, the payment server 116 identifies the deceptive character and a position of the deceptive character in the deceptive PIN.

At 568, the payment server 116 checks if the position of the deceptive character during a current transaction is same as a primary position in a previous transaction. At 570, the actual character corresponding to the deceptive character in the deceptive PIN is determined by the payment server 116. The payment server 116 retrieves the predefined mathematical expression and the predefined value registered by the cardholder 126 with the payment card 300 at the payment server 116 to determine the actual character.

At 572, the payment server 116 replaces the deceptive character in the deceptive PIN with the actual character to generate a reconstructed PIN. At 574, the payment card information of the cardholder 126 and the reconstructed PIN are sent to the issuer server 118 for verification. At 576, the issuer server 118 verifies an issuer account of the cardholder 126. The issuer server 118 verifies whether the constructed PIN received from the payment server 116 is an actual PIN linked to an associated issuer account of the cardholder 126 for which the payment card 112 was issued to the cardholder 126. The issuer server 118 further checks the account balance of the issuer account and if the account balance is enough to accommodate the transaction amount of the transaction. Based on these determinations, a transaction associated with the transaction request may be facilitated.

At 578, the issuer server 118 sends a transaction approval or decline notification/message to the payment server 116. At 580, the payment server 116 sends the transaction approval or decline notification/message to the acquirer server 120. At 582, the acquirer server 120 sends the transaction approval or decline notification/message to the ATM kiosk 130. At 584, the ATM kiosk 130 generates a bill or receipt for the transaction. The bill may include the transaction amount, taxes, transaction date, POS ID information, issuer bank name and acquirer bank name, among other information. At 586, the bill is handed over to the cardholder 126.

Figure 6:
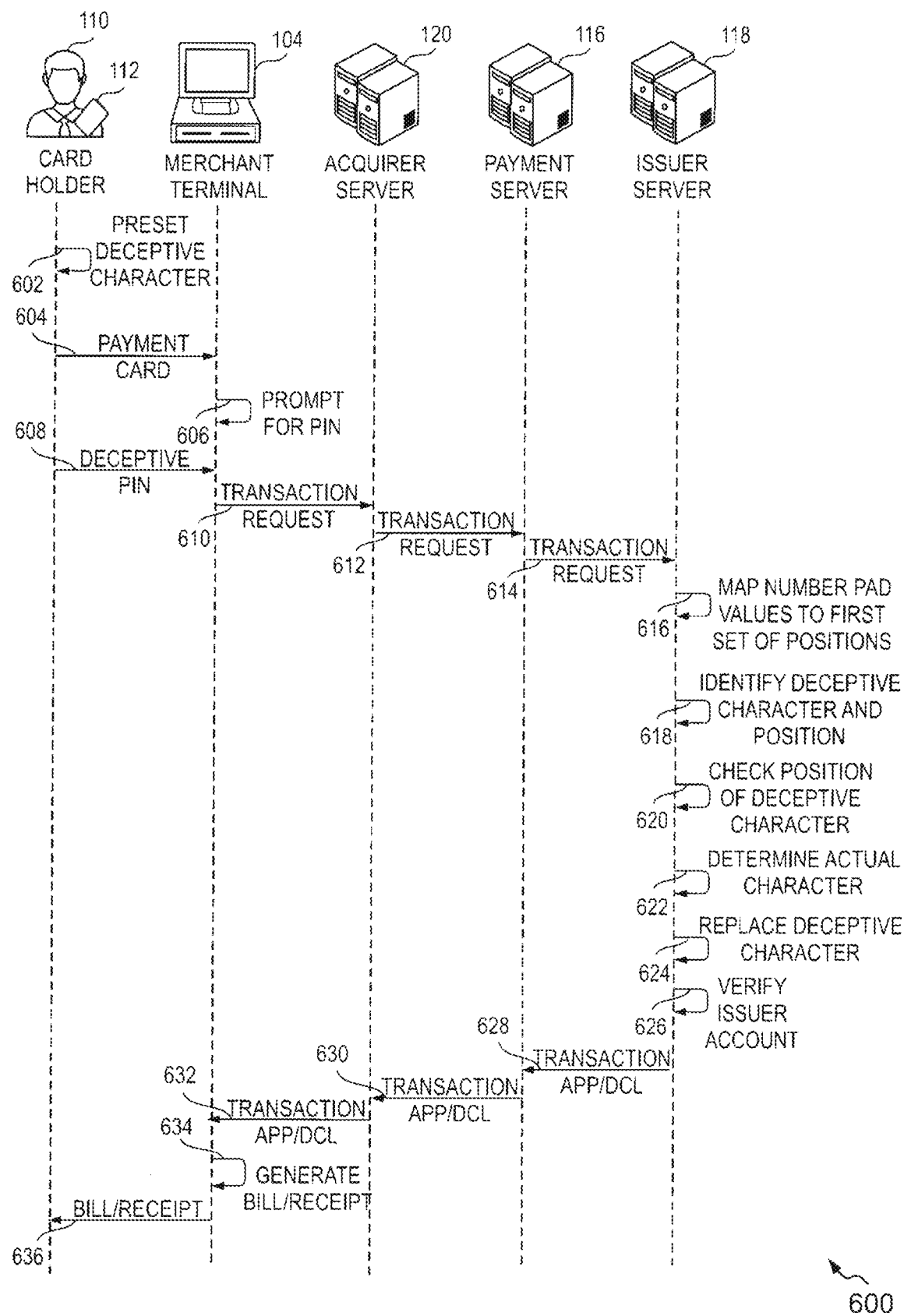
FIG. 6 illustrates a sequence flow diagram representing a method of facilitating a transaction with the payment card of FIG. 3A of the cardholder at a merchant terminal, in accordance with another example embodiment.

Referring now to FIG. 6, a sequence flow diagram 600 representing a method of facilitating a transaction with the payment card 300 of FIG. 3A of the cardholder 110 at a merchant terminal is illustrated in accordance with another example embodiment. In this example representation, services of using a deceptive character in a deceptive PIN for transactions are provided by the issuer. The cardholder 110 purchases goods or avails services at the merchant facility 102 and offers to pay using the payment card 300. When the cardholder 110 waits in a queue to pay for the goods at the merchant terminal 104, he powers ON the payment card 300.

At 602, the cardholder 110 pre-sets a deceptive character in the payment card 300. An example flow diagram of pre-setting the deceptive character in the payment card 300 is shown and explained with reference to FIG. 4A.

At 604, upon reaching the counter at the merchant terminal 104, the cardholder 110 hands over the payment card 300 to the agent 108 for initiating the transaction. The agent 108 may either swipe the payment card 300 or insert the payment card 300 in a card reader module of the merchant terminal 104 for reading the payment card information of the payment card 300. It shall be noted that the payment card 300 remains inserted in the card reader module of the merchant terminal 104 till completion of the transaction.

At 606, the merchant terminal 104 displays a prompt requesting the cardholder 110 to provide a PIN for authorizing the transaction using the payment card 300 of the cardholder 110.

At 608, the cardholder 110 provides a deceptive PIN at the merchant terminal 104. Alternatively, the payment card 300 may be powered ON upon swiping the payment card 300 or after inserting the payment card 300 in the card reader module of the merchant terminal 104. The cardholder 110 may provide the deceptive PIN on the electronic number pad (see, the electronic number pad 302) and the merchant terminal 104 may read a plurality of number pad values from the payment card 300. The plurality of number pad values may include the deceptive character and the deceptive PIN. In at least one example embodiment, the deceptive character and the deceptive PIN may be provided on the customized electronic number pad. Customizing an electronic number pad by mapping keypad input from first set of positions to a second set of position has been explained with reference to FIG. 4C. It shall be noted that either the agent 108 or any onlooker or the merchant terminal 104 are not aware of the deceptive PIN and the merchant terminal 104 accepts the deceptive PIN like any other PIN provided by customers.

At 610, the merchant terminal 104 sends a transaction request comprising the plurality of number pad values and the payment card information to the acquirer server 120. At 612, the acquirer server 120 forwards the transaction request to the payment server 116. At 614, the payment server 116 forwards the transaction request to the issuer server 118.

At 616, the issuer server 118 retrieves the customized electronic number pad settings from a database associated with the issuer server 118 for identifying the deceptive character and the deceptive PIN by mapping the plurality of number pad values from the second set of positions to a corresponding first set of positions based on the customized electronic number pad settings.

At 618, the issuer server 118 identifies the deceptive character and a position of the deceptive character in the deceptive PIN based on the deceptive character provided by the cardholder 110 via the electronic number pad of the payment card 300.

At 620, the issuer server 118 is configured to check if position (current position) of the deceptive character in the deceptive PIN is same as a primary position of the deceptive character in a preceding transaction. If the deceptive character, the position (current position) and the primary position are the same for two subsequent transactions, the issuer server 118 declines the transaction. This ensures that a fraudster, who observes the deceptive PIN being entered by the cardholder 110 at the merchant terminal 104 and steals the payment card 300, does not get access to funds of the cardholder 110.

At 622, the issuer server 118 is configured to determine an actual character corresponding to the deceptive character in the deceptive PIN. The issuer server 118 uses the predefined mathematical expression and the predefined value to determine the actual character corresponding to the deceptive character. At 624, the issuer server 118 replaces the deceptive character in the deceptive PIN by the actual character to generate a reconstructed PIN for the payment card 300. At 626, the issuer server 118 verifies an issuer account linked with the payment card 300 of the cardholder 110 for sufficiency of account balance to fund the transaction at the merchant terminal 104.

At 628, the issuer server 118 sends a transaction approval or decline notification/message to the payment server 116. At 630, the payment server 116 sends the transaction approval or decline notification/message to the acquirer server 120. At 632, the acquirer server 120 sends the transaction approval or decline notification/message to the merchant terminal 104.

At 634, the merchant terminal 104 generates a bill or a receipt for transaction. At 636, the agent 108 hands over the bill to the cardholder 110.

The registration of the deceptive character, the predefined formula and the predefined value for using the deceptive PIN with the payment card 112/300 during transactions is facilitated by an application interface. The application interface provides one or more UIs to receive the payment card information and place the registration request with a server system so as to enable registration for using deceptive PIN. An example UI for placing the registration request is shown and explained with reference to FIG. 7.

Figure 7:
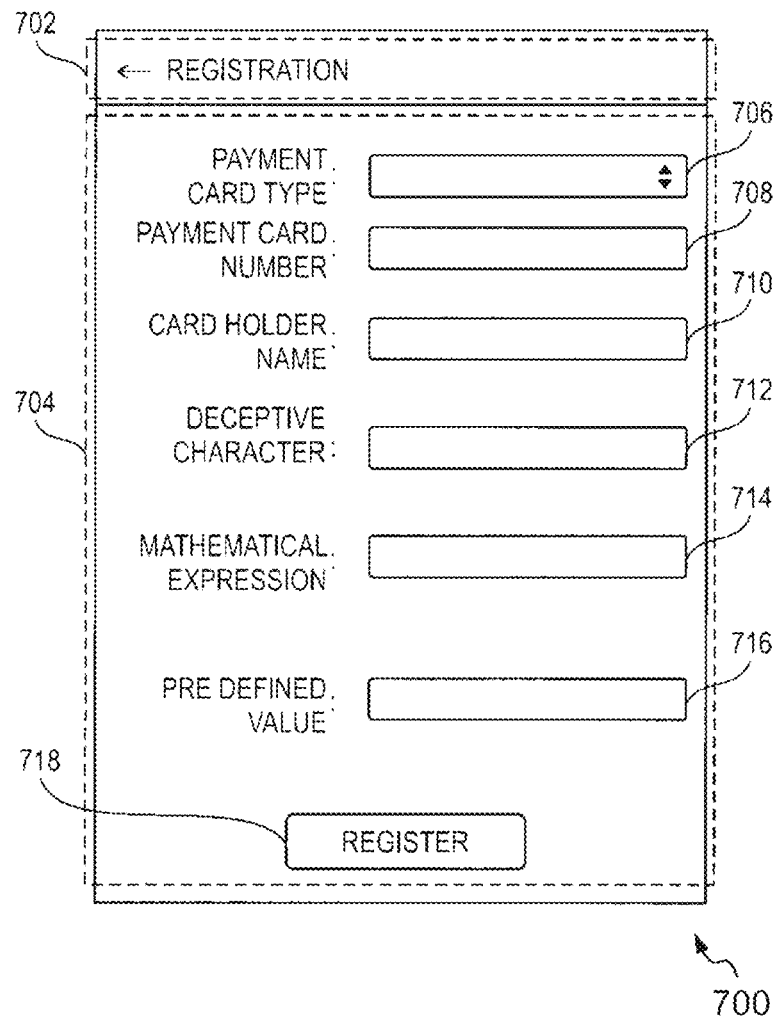
FIG. 7 illustrates an example representation of a UI displayed to a cardholder on a display screen of a user device for registration of a deceptive character for use in a deceptive PIN during a transaction with a payment card of the cardholder, in accordance with an example embodiment.

FIG. 7 illustrates an example representation of a UI 700 displayed to the cardholder 110 on a display screen of a cardholder device (e.g., the device 114) for registration of a deceptive character for use in a deceptive PIN during a transaction with a payment card 112 of the cardholder 110, in accordance with an example embodiment. In at least example embodiment, the UI 700 is presented by an application interface. The application interface is a software application facilitated by the payment server 116 or the issuer server 118.

The application interface may provide an option associated with a label 'REGISTRATION' to register for services of using a deceptive PIN with the payment card 112 and for facilitating linking of a deceptive character that may be used in the deceptive PIN during transactions. The UI 700 may be displayed to the cardholder 110 upon selection of the option associated with the label 'REGISTRATION'. It is noted that the provisioning of the 'REGISTRATION' option is explained herein for illustration purposes and may not be considered as limiting the scope of the disclosure. Alternatively, the UI 700 may be displayed to the cardholder 110 by selection of other options or options with different labels than the labels explained herein.

The UI 700 is depicted to include a header portion 702 and a content portion 704. The header portion 702 is depicted to exemplarily display a title associated with text 'REGISTRATION'.

The content portion 704 of the UI 700 is depicted to display fields such as payment card type (shown as 'PAYMENT CARD TYPE'), a payment card identifier of the customer (shown as 'PAYMENT CARD NUMBER'), a name of the cardholder 110 (shown as 'CARDHOLDER NAME'), a deceptive character for use in transactions with the payment card (shown by a prompt as 'PLEASE PROVIDE A DECEPTIVE CHARACTER'), a predefined mathematical expression (shown as 'MATHEMATICAL EXPRESSION') and an output value for the mathematical expression (shown as 'PREDEFINED VALUE'). Each field from among the fields is depicted to be associated with a text box. For example, the field 'PAYMENT CARD TYPE' is associated with a text box 706, the field 'PAYMENT CARD NUMBER' is associated with a text box 708, the field 'CARDHOLDER NAME' is associated with a text box 710, the field 'DECEPTIVE CHARACTER' is associated with a text box 712, the field 'MATHEMATICAL EXPRESSION' is associated with a text box 714 and the field 'PREDEFINED VALUE' is associated with a text box 716.

The cardholder 110 may provide a type of the payment card in the text box 706. In an example, the text box 706 may also be a drop down menu displaying a list of payment card types (e.g., credit card, debit card). A number or identifier (e.g., the payment card number of a debit card) of the payment card (e.g., the payment card 112) is provided by the cardholder 110 in the text box 708. The identifier of the payment card may be fixed-length numerical identifier or variable length identifier of any combination of alphabets, numbers and special characters. The name of the cardholder 110 is provided in the textbox 710.

The cardholder 110 provides a deceptive character that he/she intends to use in future transactions in the textbox 712. However, it shall be noted that the deceptive character can be any of a character other than a set of actual characters in an actual PIN for the payment card 112. For example, if the actual PIN is "5294", the cardholder 110 has options of providing any of a character '0', '1', '3', '6', '7', '8' as the deceptive character. In some embodiment, the text box 712 may be replaced by a drop down menu that lists the options of characters for the cardholder 110. The mathematical expression 714 may be an algebraic expression with one or more mathematical operators. An example of the mathematical expression would be $(2*a+(b+(c*d)))$. It shall be noted that character '0' may not be used as deceptive character in mathematical expressions comprising multiplication or division as it may result in an indeterminate value. In other terms, the textbox 712 may not accept a deceptive character '0' when the mathematical expression has multiplication or division as one of its mathematical operators. The predefined value 716 is an output value that is obtained when the mathematical expression 714 is applied on the actual set of characters of the actual PIN and is provided by the cardholder 110 in the textbox 714. In an example, if the actual PIN is "5294", the variables a, b, c, d assume values as follows: a=5, b=2, c=9, d=4.

Mathematical expression: $2*a+(b+(c*d))$
Actual PIN: 5294
Predefined value: 48

The predefined value is determined using the mathematical expression $(2*5*(2+(9*4))=48)$ as depicted above. The mathematical expression 714 and the predefined value 716 may be used to determine the actual character corresponding to a deceptive character in the deceptive PIN. The content portion 704 of the UI 700 is further configured to depict a tab 718 associated with text 'REGISTER'. The cardholder 110 may provide a touch or a click input on the tab 718 to register for services of using a deceptive PIN including the deceptive character. In at least one example embodiment, the selection of the tab 718 may cause display of another UI prompting the cardholder 110 to authenticate his identity by providing an OTP or an actual PIN or answering a security question to confirm registration.

Figure 8A:
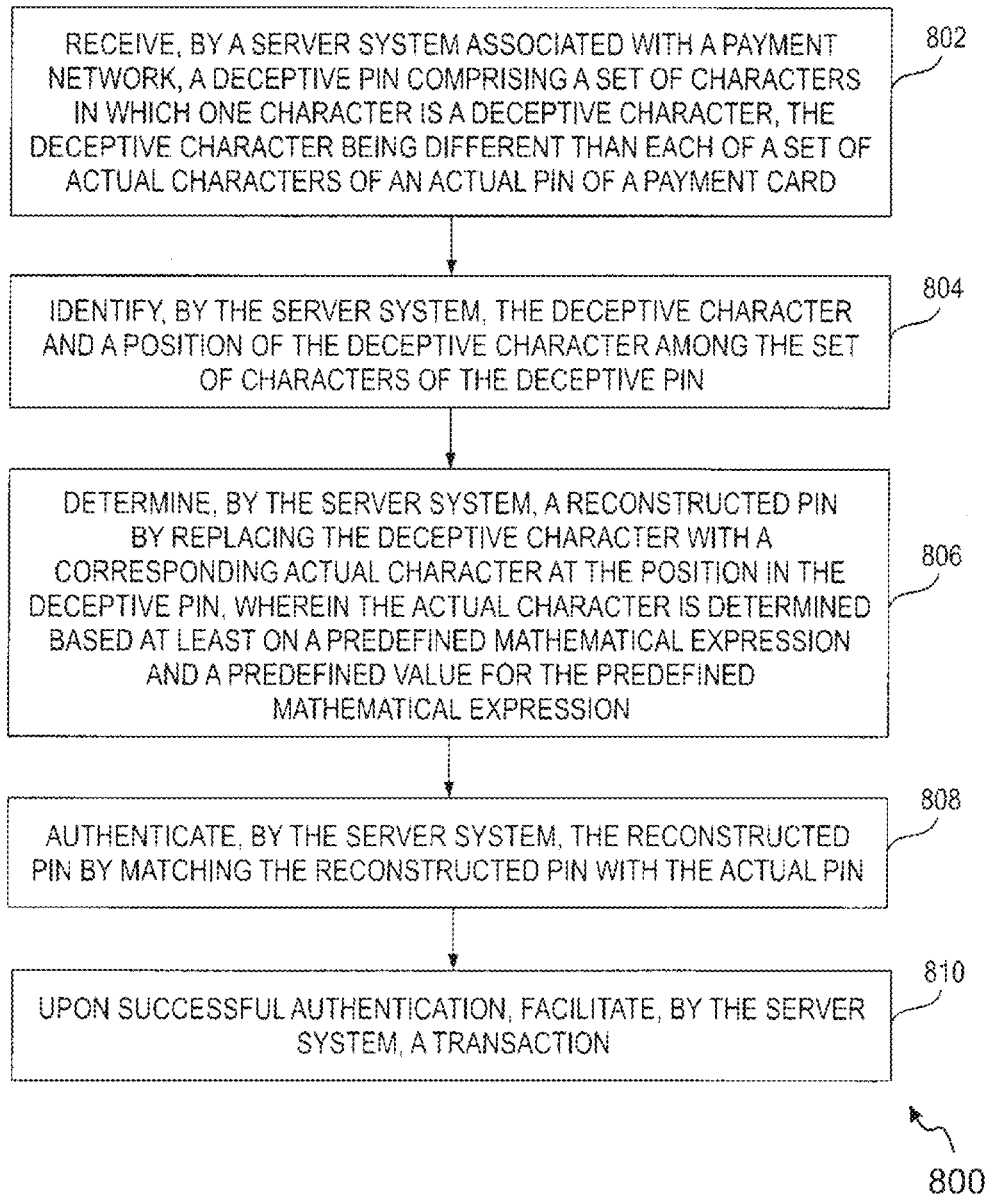
FIG. 8A illustrates a flow diagram of a method for facilitating a transaction using a deceptive PIN with a payment card of a cardholder, in accordance with an example embodiment.

Referring now to FIG. 8A, a flow diagram of a method 800 for facilitating a transaction using a deceptive PIN with a payment card of a cardholder is illustrated in accordance with an example embodiment. The method 800 depicted in the flow diagram may be executed by, for example, the payment server 116 or the issuer server 118. Operations of the flow diagram, and combinations of operation in the flow diagram, may be implemented by, for example, hardware, firmware, a processor, circuitry and/or a different device associated with the execution of software that includes one or more computer program instructions. The operations of the method 800 are described herein with help of the payment server 116. It is noted that the operations of the method 800 can be described and/or practiced by using a system other than the payment server 116, such as the acquirer server 120 or the issuer server 118. The method 800 starts at operation 802.

At operation 802, the method 800 includes receiving, by a server system associated with a payment network, a deceptive pin including a set of characters in which one character is a deceptive character. The deceptive character is different than each of a set of actual characters of an actual pin of the payment card. For example, the actual pin for a payment card (e.g., the payment card 112) may comprises the set of actual characters '4', '1', '8', '6' (or the actual PIN "4186"). The cardholder may choose a character different from the set of actual characters '4', '1', '8', '6' as the deceptive character. In an example, the cardholder can choose any of a character '0', '2', '3', '5', '7' and '9' (not present in the actual PIN) as the deceptive character. Assuming the cardholder selects the deceptive character as '3', the cardholder has to register the deceptive character prior to use in a deceptive PIN during a transaction. In at least one example embodiment, the cardholder can register the deceptive character via an application interface (shown in FIG. 7). If the cardholder has a payment card such as, for example, the payment card 300 (shown in FIG. 3A), the cardholder can register the deceptive character using a keypad (see, the electronic number pad 302) of the payment card 300 prior to performing the transaction.

At operation 804, the method 800 includes identifying, by the server system, the deceptive character and a position of the deceptive character among the set of characters of the deceptive PIN. In at least one example embodiment, the deceptive character provided by the cardholder, either via the application interface or the payment card 300, is stored in a database associated with the server system. The server system retrieves the deceptive character from the database and compares it against the deceptive PIN to identify the deceptive character and the position of the deceptive character. For example, if the cardholder has provided a deceptive PIN "4386" in place of the actual PIN and if the cardholder has registered the deceptive character '3' with the server system, the server system identifies the deceptive character in the deceptive PIN and the location of the deceptive character as a second character of the set of characters of the deceptive PIN.

At operation 806, the method 800 includes determining, by the server system, a reconstructed PIN by replacing the deceptive character with the corresponding actual character at the position in the deceptive PIN. The actual character is determined based at least on a predefined mathematical expression and a predefined value for the predefined mathematical expression. In at least one example representation, the cardholder who registers for services of using a deceptive character in a deceptive PIN also registers a predefined mathematical expression and a predefined value with the server system. It shall be noted that the predefined mathematical expression when applied to the set of characters of the deceptive PIN yields the predefined value. In an example embodiment, the deceptive character in the deceptive PIN is removed from the set of characters to form a subset of characters of the actual PIN. The predefined mathematical expression is applied on the subset of characters to define an intermediate expression. Further, the server system solves the intermediate expression based on the predefined value to determine the actual character corresponding to the deceptive character. In an example, assuming the cardholder has registered the deceptive character '3', a mathematical expression of "a+b+c+d" and a predefined value of "19" with the server system for a payment card associated with an actual PIN of "4186". The cardholder may provide a deceptive PIN "4386" at the merchant terminal during a transaction. The server system identifies the deceptive character '3' and determines the actual character as follows:

subset of characters: '4', '8', '6'
intermediate expression: 4+b+8+6=19 (or) 18+b=19
based on the mathematical expression (a+b+c+d=19)
actual character: 1

The actual PIN (also referred to as 'reconstructed PIN') for the payment card 112/300 based on the deceptive character is reconstructed by replacing the deceptive character by the actual character determined by the server system.

At operation 808, the method 800 includes authenticating, by the server system, the reconstructed PIN by matching the reconstructed PIN with the actual PIN. The reconstructed PIN is compared against the actual PIN (also referred to as 'a registered PIN') in the database of the server system for authenticating the transaction. If the actual PIN and the reconstructed PIN match, the transaction is an authorized transaction. For example, if the reconstructed PIN is "4186" and the actual PIN is also "4186", then the transaction is authorized by the server system.

At operation 810, upon successful authentication, the method 800 includes facilitating the transaction. The server system also verifies the payment card information, details of the cardholder and account balance of the cardholder after authorizing the PIN so as to facilitate the transaction.

Figure 8B:
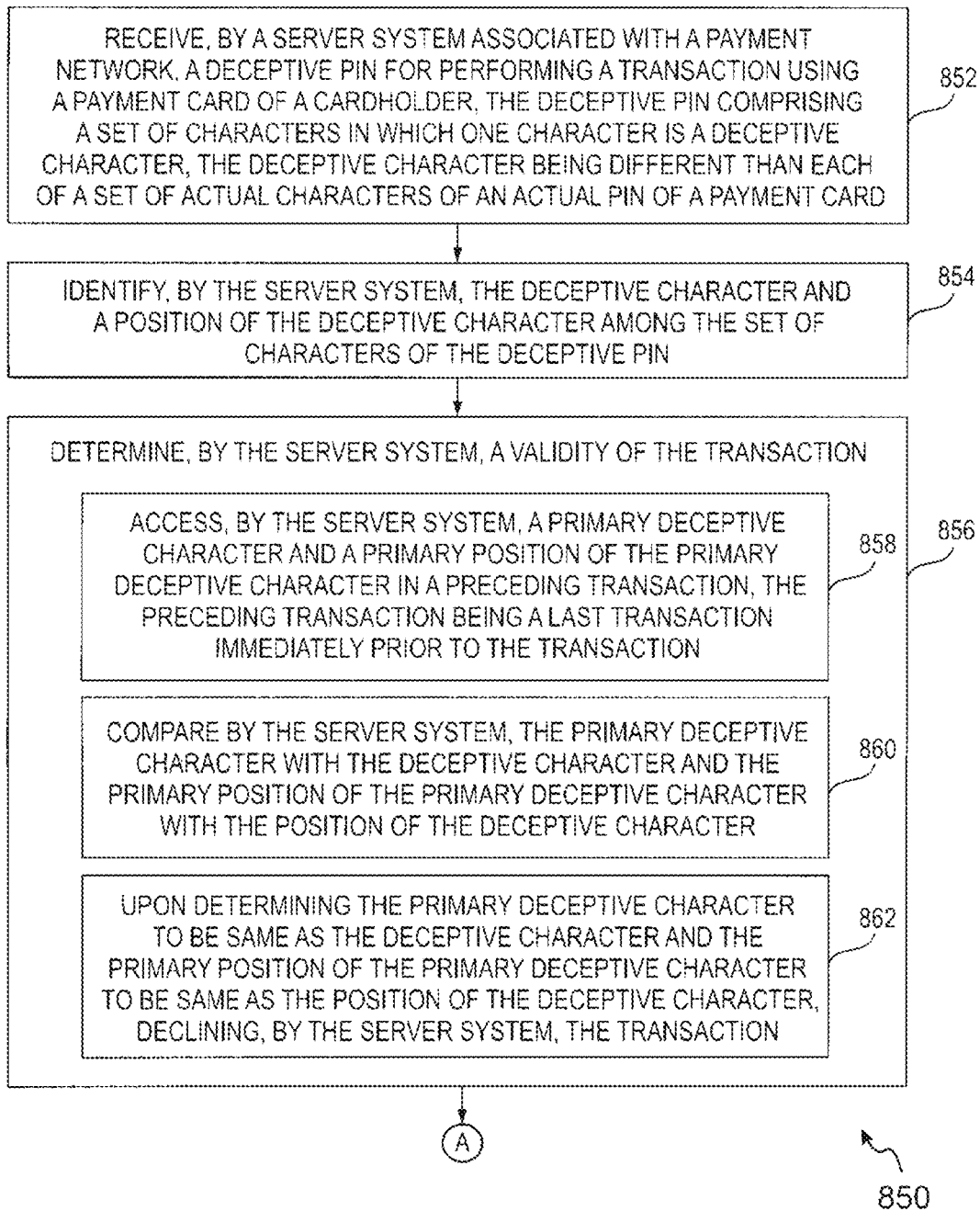
FIG. 8B illustrates a flow diagram of a method for facilitating a transaction using a deceptive PIN with a payment card of a cardholder, in accordance with another example embodiment.
Figure 8C:
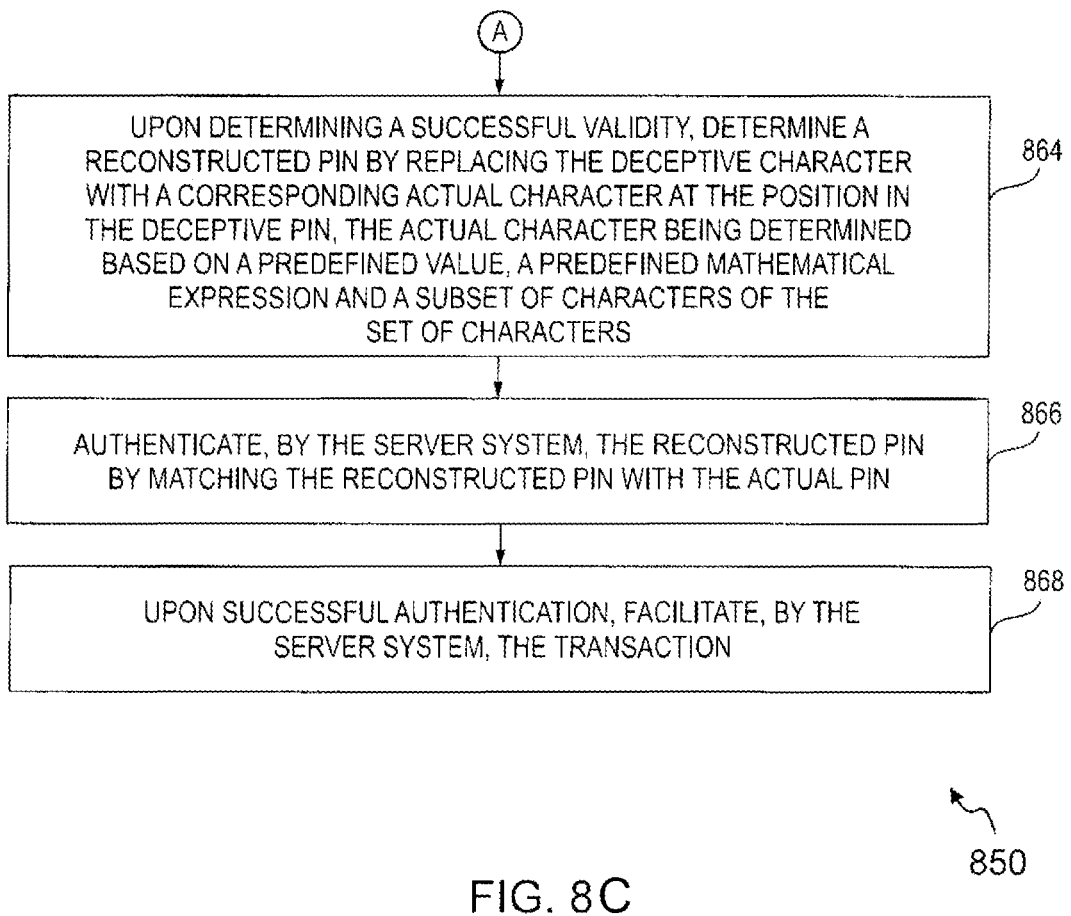

Referring now to FIG. 8B, a flow diagram of a method 850 for facilitating a transaction using a deceptive PIN with a payment card of a cardholder is illustrated in accordance with an example embodiment. The method 850 depicted in the flow diagram may be executed by, for example, the payment server 116 or the issuer server 118. Operations of the flow diagram, and combinations of operation in the flow diagram, may be implemented by, for example, hardware, firmware, a processor, circuitry and/or a different device associated with the execution of software that includes one or more computer program instructions. The operations of the method 850 are described herein with help of the payment server 116. It is noted that the operations of the method 800 can be described and/or practiced by using a system other than the payment server 116, such as the acquirer server 120 or the issuer server 118. The method 850 starts at operation 852.

At operation 852, the method 850 includes receiving, by a server system associated with a payment network, a deceptive PIN for performing a transaction using a payment card of a cardholder. The deceptive PIN comprising a set of characters in which one character is a deceptive character. The deceptive character is different than each of a set of actual characters of an actual pin of the payment card 112.

At operation 854, the method 850 includes identifying, by the server system, the deceptive character and a position of the deceptive character among the set of characters of the deceptive PIN.

At operation 856, the method 850 includes determining, by the server system, a validity of the transaction. The operation 856 may be performed by operations 858, 860 and 862. At operation 858, the method 850 includes accessing, by the server system, a primary deceptive character and a primary position of the primary deceptive character in a previous transaction. The preceding transaction herein refers to the last transaction that is immediately prior to the current transaction. For example, if the cardholder is performing a transaction at merchant 1 using the payment card 112 and if he/she had performed a transaction at merchant 2 prior to shopping at merchant 1 using the payment card 112, the deceptive character and position of the deceptive character for the transactions at merchant 1 and merchant 2 are compared. At operation 860, the method 850 includes comparing, by the sever system, the primary deceptive character with the deceptive character and the primary position of the primary deceptive character with the position of the deceptive character. In an example, if the deceptive character used by the cardholder is '5' and if the deceptive PIN provided at merchant 2 is "4259" and the deceptive PIN at merchant 1 is "5269", the primary deceptive character is '5' and a primary position of the primary deceptive character in the previous transaction (transaction at merchant 2) is third character of the set of characters. The position of the deceptive character in the deceptive PIN for the transaction at merchant 1 is first character. In this example scenario, although deceptive character is same, the position and the primary position are different for the consecutive transactions at merchant 1 and merchant 2, hence the transaction is processed further.

At operation 862, the method 850 includes upon determining the primary deceptive character to be same as the deceptive character and the primary position of the primary deceptive character to be same as the position of the deceptive character, declining the transaction. In at least one example embodiment, if the deceptive character and position of the deceptive character is same in two consecutive transactions, the transaction is declined by the server system. When the deceptive character and the primary deceptive character are identical, the position and the primary position are also checked to determine the similarity. If the position and deceptive character are similar, it may be indicative of a fraudster trying to misuse the payment card 112 of the cardholder based on the deceptive PIN he/she noticed when the cardholder was performing a previous transaction. In cases where the cardholder may provide the deceptive PIN similar to the previous transaction, the server system may decline the transaction and prompt the cardholder to provide an appropriate PIN.

However, if at operation 856 and particularly at operation 862, the transaction is not declined (i.e. upon determining successful validity of the transaction), at operation 864, the method 850 includes determining, by the server system, a reconstructed PIN by replacing the deceptive character with a corresponding actual character at the position in the deceptive PIN. In at least one embodiment, the cardholder who registers for services of using a deceptive character in a deceptive PIN also registers a predefined mathematical expression and a predefined value with the server system. In an example embodiment, the deceptive character in the deceptive PIN is removed to form a subset of characters of the set of characters of the actual PIN. The predefined mathematical expression is applied on the subset of characters to determine an intermediate expression that is solved to determine the actual character corresponding to the deceptive character. At operation 866, the method 850 includes authenticating, by the server system, the reconstructed pin by comparing with the actual PIN. At operation 868, the method 850 includes facilitating, by the server system, the transaction, upon successful authentication.

The sequence of operations of the method 800/850 need not be necessarily executed in the same order as they are presented. Further, one or more operations may be grouped together and performed in form of a single step, or one operation may have several sub-steps that may be performed in parallel or in sequential manner.

Figure 9:
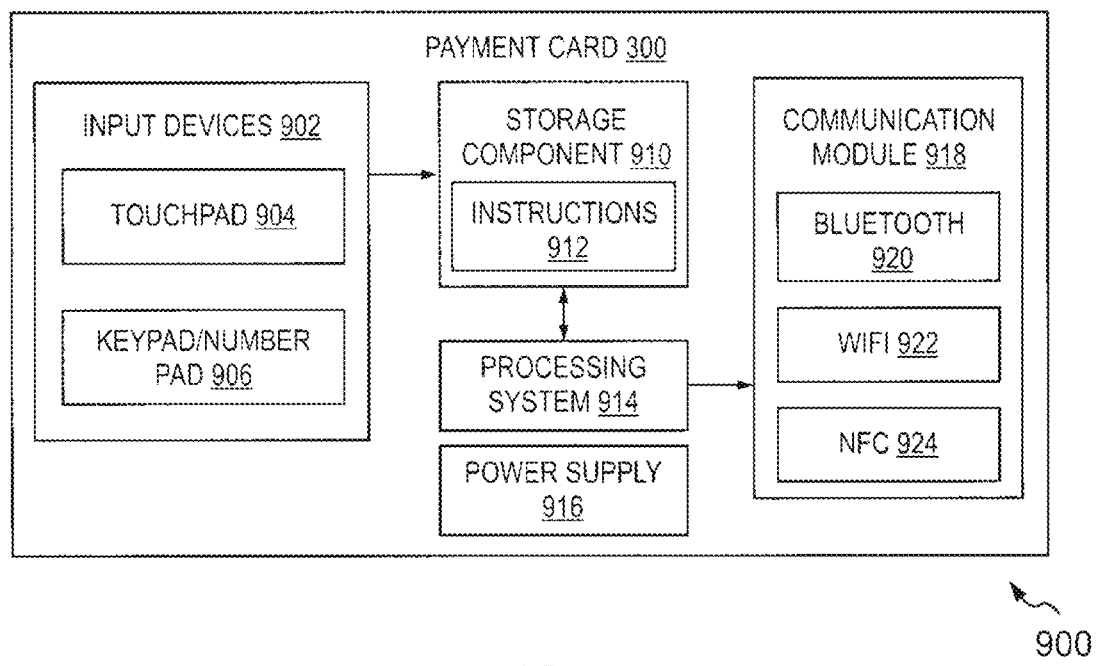
FIG. 9 is a simplified schematic block diagram of the payment card of FIG. 3A, in accordance with an example embodiment.

FIG. 9 is a simplified schematic representation 900 of a block diagram of the payment card 300 of FIG. 3A, in accordance with an example embodiment. As shown in FIG. 9, the payment card 300 can support one or more input devices 902. Examples of the input devices 902 may include, but are not limited to, a touchpad 904 and a keypad/number pad 906 (such as the electronic number pad 302 in FIG. 3). The keypad 906 can be an electronic keypad comprising a control circuitry that converts key presses into codes. The keypad 906 can also be a mechanical keypad. Examples of electronic keypads include optical keypads or capacitive keypads.

The representation 900 of the payment card 300 depicts a storage component or a memory component 910. Examples of the storage component 910 may include a non-removable memory and/or removable memory. The non-removable memory can include RAM, ROM, flash memory, or other well-known memory storage technologies. The removable memory can include flash memory and smart cards. In this example, the storage component 910 is a chip (Integrated Circuit) based storage/memory. Apart from keypad input data, customer information and card information (e.g., type of card, type of customer membership, card number, name of the cardholder, cardholder's account number, PIN, expiry date of the payment card, name of issuing bank, etc.) are also stored in the storage component 910. The storage component 910 also stores the deceptive character provided by the cardholder prior to a transaction. The storage component 910 may also be used for storing data and/or instructions such as instructions 912.

The instructions 912 are executable by a processing system 914 to enable the storage component 910 to read a keypad press, to store a keypad input, to transfer or write a keypad input to another device, etc. The processing system 914 can be a signal processor, microprocessor, ASIC, or other control and processing logic circuitry for performing such tasks as signal coding, data processing, input/output processing, power control, and/or other functions. The processing system 914 may be configured to perform processing of the keypad input. In another embodiment, a processing system such as the processing system 914 may not be provisioned within the payment card 300. The storage component 910 may be configured with the instructions 912 and the processing capabilities.

The payment card 300 includes a power supply 916 which comprises a thin battery or a capacitor used to power the input devices 902 and optionally some of the other card electrical components such as the processing system 914 of the payment card 300. In an alternate embodiment, the payment card 300 may or may not need a battery, wherein the payment card 300 is configured to be powered when inserted into a terminal such as a POS card reader device (such as the merchant terminal 104).

A communication module 918 can be coupled to one or more antennas (not shown in the FIG. 9) and can support two-way communications between the processing system 914 and external devices, as is well understood in the art. The communication module 918 is shown generically and can be configured with wireless communication modules that enable transfer of data from the payment card 300 to the merchant terminal 104 over short ranges/distances. Examples of the communication module 918 include Bluetooth 920, WiFi 922, Near Field Communication (NFC) 924, etc.

Figure 10:
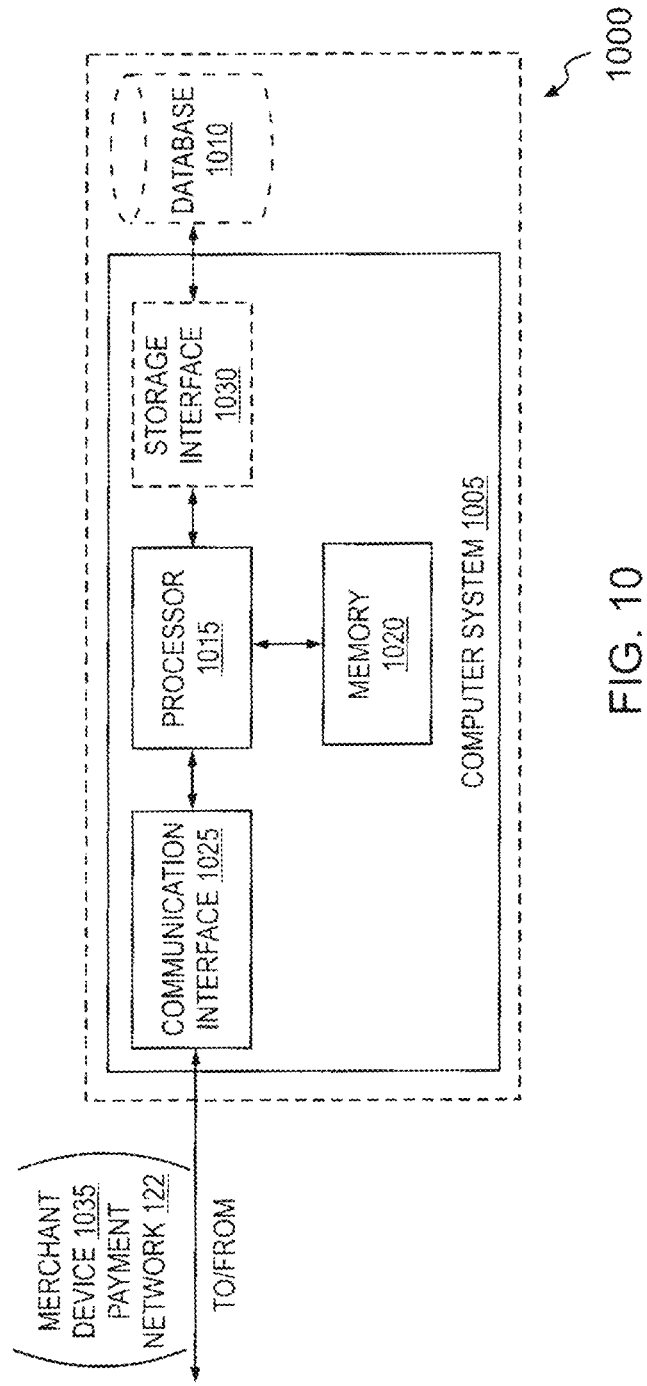
FIG. 10 is a simplified block diagram of the server system used for facilitating the transaction using a deceptive PIN with the payment card of the cardholder, in accordance with one embodiment of the present disclosure.

FIG. 10 is a simplified block diagram of a server system 1000 used for facilitating a payment transaction with a payment card, in accordance with one embodiment of the present disclosure. Examples of the server system 1000 include, but are not limited to, the acquirer server 120, the payment server 116 and the issuer server 118 illustrated in FIG. 1. The server system 1000 includes a computer system 1005 and a database 1010.

The computer system 1005 includes at least one processor 1015 for executing instructions. Instructions may be stored in, for example, but not limited to, a memory 1020. The processor 1015 may include one or more processing units (e.g., in a multi-core configuration).

The processor 1015 is operatively coupled to a communication interface 1025 such that the computer system 1005 is capable of communicating with a remote device such as a merchant device 1035 (e.g., the merchant terminal 104 or the ATM kiosk 130) or communicating with any entity within the payment network 122. For example, the communication interface 1025 may receive the transaction request, where the transaction request is generated in response to purchase of products by a customer and scanning of the products at a checkout counter by an agent.

The processor 1015 may also be operatively coupled to the database 1010. The database 1010 is any computer-operated hardware suitable for storing and/or retrieving data, such as, but not limited to, transaction data generated as part of sales activities conducted over the bankcard network including data relating to merchants, account holders or customers, and purchases. The database 1010 may also store information related to a plurality of user's issuer accounts. Each user account data includes at least one of a cardholder name, a cardholder address, an account number, MPIN, and other account identifier. The database 1010 may also store information of a plurality of merchants, plurality of loyalty programs offered by the plurality of merchants, plurality of POS terminals installed at merchant facilities, such as POS ID, etc. The database 1010 may also include instructions for settling transactions including merchant bank account information. The database 1010 includes customized electronic number pad settings for payment cards of the plurality of customers and other information related to use of deceptive PIN such as, deceptive character, predefined mathematical expression and predefined value for each of the plurality of customers. The database 1010 may include multiple storage units such as hard disks and/or solid-state disks in a redundant array of inexpensive disks (RAID) configuration. The database 1010 may include a storage area network (SAN) and/or a network attached storage (NAS) system.

In some embodiments, the database 1010 is integrated within the computer system 1005. For example, the computer system 1005 may include one or more hard disk drives as the database 1010. In other embodiments, the database 1010 is external to the computer system 1005 and may be accessed by the computer system 1005 using a storage interface 1030. The storage interface 1030 is any component capable of providing the processor 1015 with access to the database 1010. The storage interface 1030 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 1015 with access to the database 1010.

The processor 1015 is configured to facilitate a transaction from an issuer account to an acquirer account (merchant account). The processor 1015 is configured to perform one or more functions such as: register the deceptive character, mathematical expression and the predefined value provided by the cardholder 110, store the customized electronic number pad settings, receive a transaction request, map second set of positions of the deceptive pin and/or deceptive character to first set of positions based on the customized electronic number pad settings, identify the deceptive character in the deceptive PIN, determine an actual character corresponding to the deceptive character, replace the deceptive character by the actual character to form a reconstructed PIN, authenticate the cardholder 110, verify payment card details and check available standing balance in an issuer account of the cardholder 110, among others. The processor 1015 is further configured to verify the reconstructed PIN of the payment card 112/300. Thereafter, the processor 1015 is configured to facilitate the transaction from the issuer account of the cardholder 110 to the acquirer account of the merchant. The processor 1015 may also be configured to notify the merchant terminal 104 and the merchant interface device 106 of the transaction status via the communication interface 1025.

Figure 11:
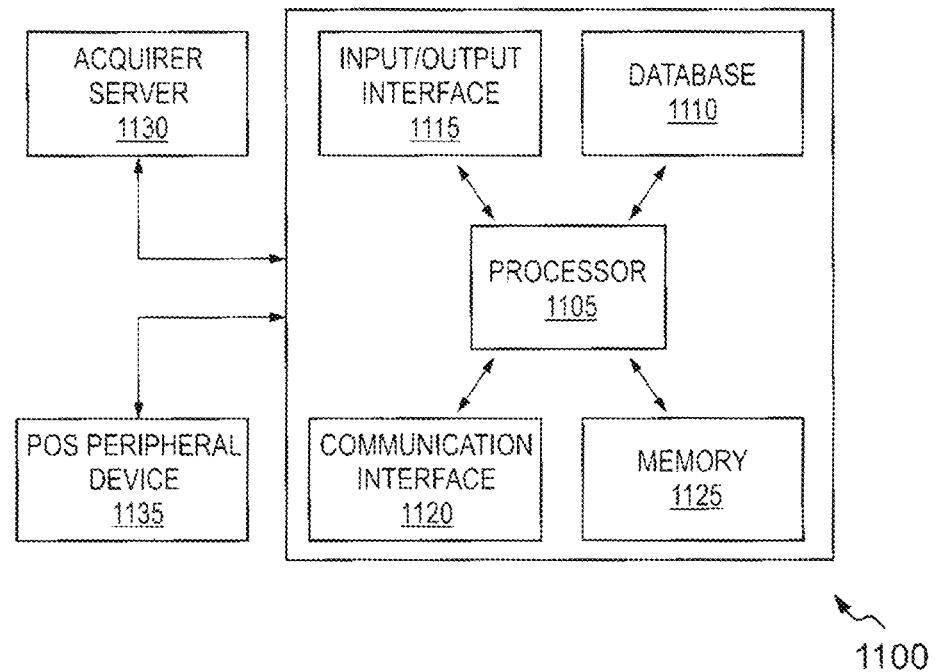
FIG. 11 is a simplified block diagram of a merchant terminal or a POS terminal used for facilitating the transaction using a deceptive PIN with a payment card of a cardholder, in accordance with one embodiment of the present disclosure.

FIG. 11 is a simplified block diagram of a merchant terminal 1100 used for transactions, in accordance with one embodiment of the present disclosure. The merchant terminal 1100 as explained herein is only one example of the merchant terminal 104. In various embodiments, the merchant terminal 1100 can be a merchant mobile phone, a kiosk, a PDA, a merchant facilitated e-commerce website interface running on a computing device and the like. The merchant terminal 1100 includes at least one processor 1105 communicably coupled to a database 1110, an Input/Output (I/O) interface 1115, a communication interface 1120 and a memory 1125. The components of the merchant terminal 1100 provided herein may not be exhaustive, and that the merchant terminal 1100 may include more or fewer components than that of depicted in FIG. 11. Further, two or more components may be embodied in one single component, and/or one component may be configured using multiple sub-components to achieve the desired functionalities. Some components of the POS terminal 1100 may be configured using hardware elements, software elements, firmware elements and/or a combination thereof.

The I/O interface 1115 is configured to receive inputs from and provide outputs to the end-user (i.e. the merchant and/or the customer) of the merchant terminal 1100. For instance, the I/O interface 1115 may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a UI display (such as a light emitting diode display, a thin-film transistor (TFT) display, a liquid crystal display, an active-matrix organic light-emitting diode (AMOLED) display, etc.), a speaker, a ringer, a vibrator, and the like.

The memory 1125 can be any type of storage accessible to the processor 1105. For example, the memory 1125 may include volatile or non-volatile memories, or a combination thereof. In some non-limiting examples, the memory 1125 can be four to sixty four MegaBytes (MB) of Dynamic Random Access Memory ("DRAM") or Static Random Access Memory ("SRAM"). In addition, some examples may include supplementary flash memory installed via a PCMCIA slot.

The database 1110 is capable of storing and/or retrieving data, such as, but not limited to, smart card insertions, user/customer information, merchant information, touchscreen key depressions, keypad key depressions, number of dots printed by the slip and roll printers, check read errors, card swipes, such as, plurality of number pad values of the payment card 300 and the like. Such information can be accessed by the processor 1105 using the communication interface 1120 to determine potential future failures and the like.

The merchant terminal 1100 is capable of communicating with one or more POS peripheral devices such as a POS peripheral device 1135 and external server system such as an acquirer server 1130 (an example of the acquirer server 120 of FIG. 1) via the communication interface 1120. The POS peripheral device 1135 can provide functionality which is used by a consumer at a merchant facility, such as PIN entry, merchant transaction amount entry, clear text entry, signature capture, and the like. Some non-exhaustive examples of the POS peripheral device 1135 include POS card reader device, barcode scanner, cash drawer, receipt printer, PIN pad, signature capture device, touchscreen, keyboard, portable data terminal, customer pole display and the like. In some embodiments, the POS terminal 1100 may be mounted near a cash register at a check-out counter in the merchant facility, while the POS peripheral device 1135 may be mounted on the check-out counter such that it is accessible to the users. In this way, both the merchant and the user/customer can interact with similar devices to process the payment transaction.

The communication interface 1120 is further configured to cause display of user interfaces on the merchant terminal 1100. In one embodiment, the communication interface 1120 includes a transceiver for wirelessly communicating information to, or receiving information from, the acquirer server 1130 or other suitable display device, and/or another type of remote processing device. In another embodiment, the communication interface 1120 is capable of facilitating operative communication with the remote devices and a cloud server using Application Program Interface (API) calls. The communication may be achieved over a communication network.

The processor 1105 is capable of sending the transaction request received from the end-user via the communication interface 1120 to the acquirer server 1130 for processing the transaction. For example, the processor 1105 is configured to receive the payment card information of the cardholder 110, deceptive PIN and the transaction amount via the POS peripheral device 1135. The processor 1105 can access the database 1110 to retrieve the user information and merchant information that are required to be sent along with the transaction request to the acquirer server 1130.

Additionally, the merchant terminal 1100 can include an operating system and various software applications that can provide various functionality to the merchant terminal 1100. For example, in some embodiments, the merchant terminal 1100 is addressable with an Internet protocol and includes a browser application. In such embodiments, the processor 1105 includes software adapted to support such functionality. In some embodiments, the processor 1105 executes software to support network management. In particular, this capacity allows software to be downloaded to a plurality of such systems to provide new applications such as application for enabling payment string based payment transactions using POS terminals and/or updates to existing applications. The operating system and software application upgrades are distributed and maintained through communication to the merchant terminal 1100 over the communication network.

Figure 12:
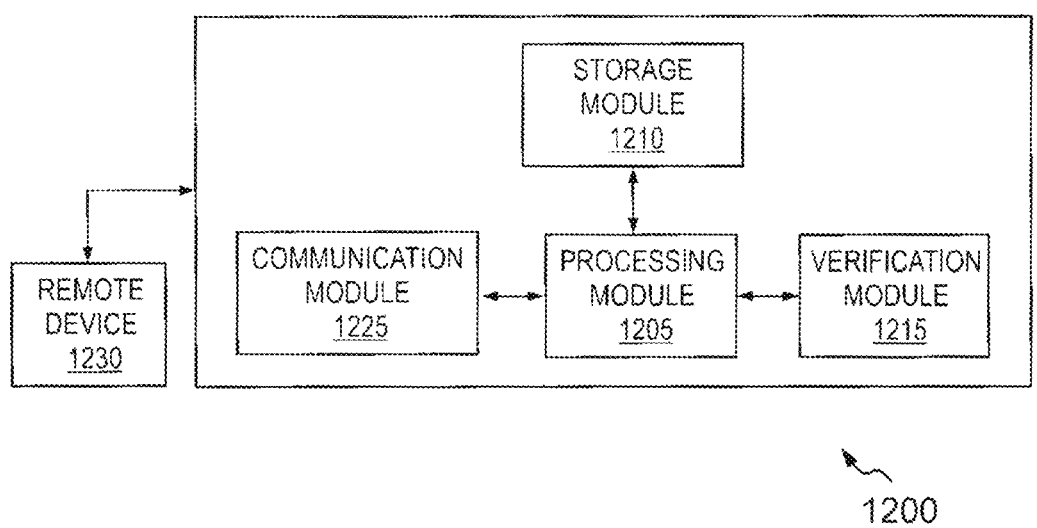
FIG. 12 is a simplified block diagram of an issuer server for facilitating the transaction using a deceptive PIN with the payment card of the cardholder, in accordance with one embodiment of the present disclosure.

FIG. 12 is a simplified block diagram of an issuer server 1200, in accordance with one embodiment of the present disclosure. The issuer server 1200 is an example of the issuer server 118 of FIG. 1 or may be embodied in the issuer server 118. The issuer server 1200 is associated with an issuer bank/issuer, in which a cardholder may have an account, which provides a payment card (e.g., the payment card 112/300). The issuer server 1200 includes a processing module 1205 operatively coupled to a storage module 1210, a verification module 1215 and a communication module 1225. The components of the issuer server 1200 provided herein may not be exhaustive and that the issuer server 1200 may include more or fewer components than that of depicted in FIG. 12. Further, two or more components may be embodied in one single component, and/or one component may be configured using multiple sub-components to achieve the desired functionalities. Some components of the issuer server 1200 may be configured using hardware elements, software elements, firmware elements and/or a combination thereof.

The storage module 1210 is configured to store machine executable instructions to be accessed by the processing module 1205. Additionally, the storage module 1210 stores information related to, contact information of the customer, bank account number, availability of funds in the account, payment card details, travel information of customers, and/or the like. This information is retrieved by the processing module 1205 for validation during machine-readable script generation.

The processing module 1205 is configured to communicate with one or more remote devices such as a remote device 1230 using the communication module 1225 over a network such as the payment network 122 of FIG. 1. The examples of the remote device 1230 include the merchant terminal 104, the payment server 116, the acquirer server 120, the ATM kiosk 130 and the central biometric server or other computing systems of issuer and the payment network 122 and the like. The communication module 1225 is capable of facilitating such operative communication with the remote devices and cloud servers using API (Application Program Interface) calls. The communication module 1225 is configured to receive a registration request for using a deceptive PIN. The registration request includes a deceptive character, a predefined mathematical expression and a predefined value. The communication module 1225 is configured to receive a transaction request from the merchant terminal 104 via the payment network 122. In some example embodiments, the processing module 1205 is configured to receive a deceptive PIN during a transaction, determine the deceptive character, determine an actual character corresponding to the deceptive character and replace the deceptive character with the actual character.

The verification module 1215 is configured to verify and validate a customer (such as the cardholder 110), the payment card 112/300 associated with the cardholder 110 and a PIN of the payment card for approving the transaction. The verification module 1215 may also verify if an issuer account of the customer associated with the payment card have good standing balance. The communication module 1225 is configured to send notification of approval or decline of a transaction and the machine-readable script to the merchant terminal 104 via the payment network 122.

Figure 13:
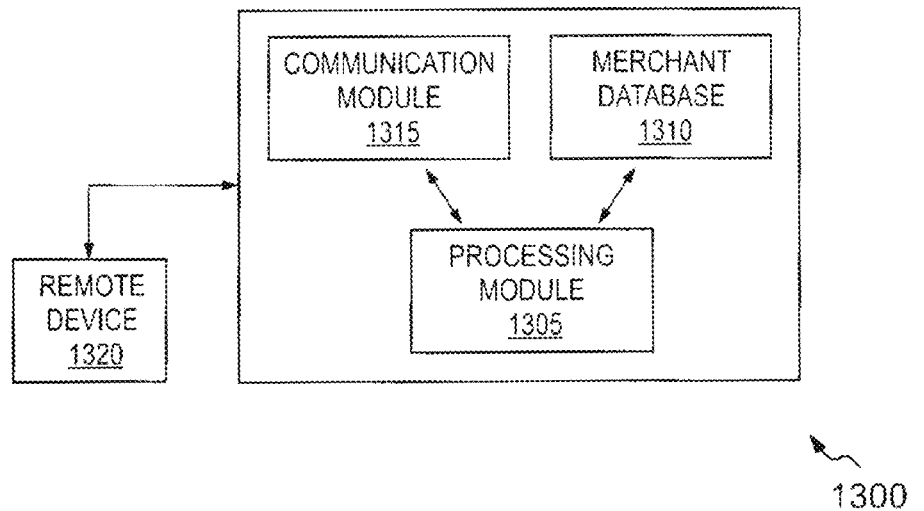
FIG. 13 is a simplified block diagram of an acquirer server used for facilitating the transaction using a deceptive PIN with the payment card of the cardholder, in accordance with one embodiment of the present disclosure.

FIG. 13 is a simplified block diagram of an acquirer server 1300 used for facilitating transactions for purchase at a merchant terminal using a payment card, in accordance with one embodiment of the present disclosure. The acquirer server 1300 is associated with an acquirer bank, which may be associated with a merchant (e.g., the merchant facility 102) at whose facility the cardholder 110 is purchasing goods. The merchant may have established an account to accept payment for purchase of goods from customers. The acquirer server 1300 is an example of the acquirer server 120 of FIG. 1 or may be embodied in the acquirer server 120. Further, the acquirer server 1300 is configured to facilitate transaction with the issuer server 1200 using a payment network, such as the payment network 122 of FIG. 1. The acquirer server 1300 includes a processing module 1305 communicably coupled to a merchant database 1310 and a communication module 1315. The components of the acquirer server 1300 provided herein may not be exhaustive, and that the acquirer server 1300 may include more or fewer components than that of depicted in FIG. 13. Further, two or more components may be embodied in one single component, and/or one component may be configured using multiple sub-components to achieve the desired functionalities. Some components of the acquirer server 1300 may be configured using hardware elements, software elements, firmware elements and/or a combination thereof.

The merchant database 1310 includes a table which stores one or more merchant parameters, such as, but not limited to, a merchant primary account number (PAN), a merchant name, a merchant ID (MID), a merchant category code (MCC), a merchant city, a merchant postal code, an MAID, a merchant brand name, terminal identification numbers (TIDs) associated with merchant terminals (e.g., the POS terminals or any other merchant electronic devices) used for processing transactions, among others. The processing module 1305 is configured to use the MID or any other merchant parameter such as the merchant PAN to identify the merchant during the normal processing of payment transactions, adjustments, chargebacks, end-of-month fees, loyalty programs associated with the merchant and so forth. The processing module 1305 may be configured to store and update the merchant parameters in the merchant database 1310 for later retrieval. In an embodiment, the communication module 1315 is capable of facilitating operative communication with a remote device 1320

Figure 14:
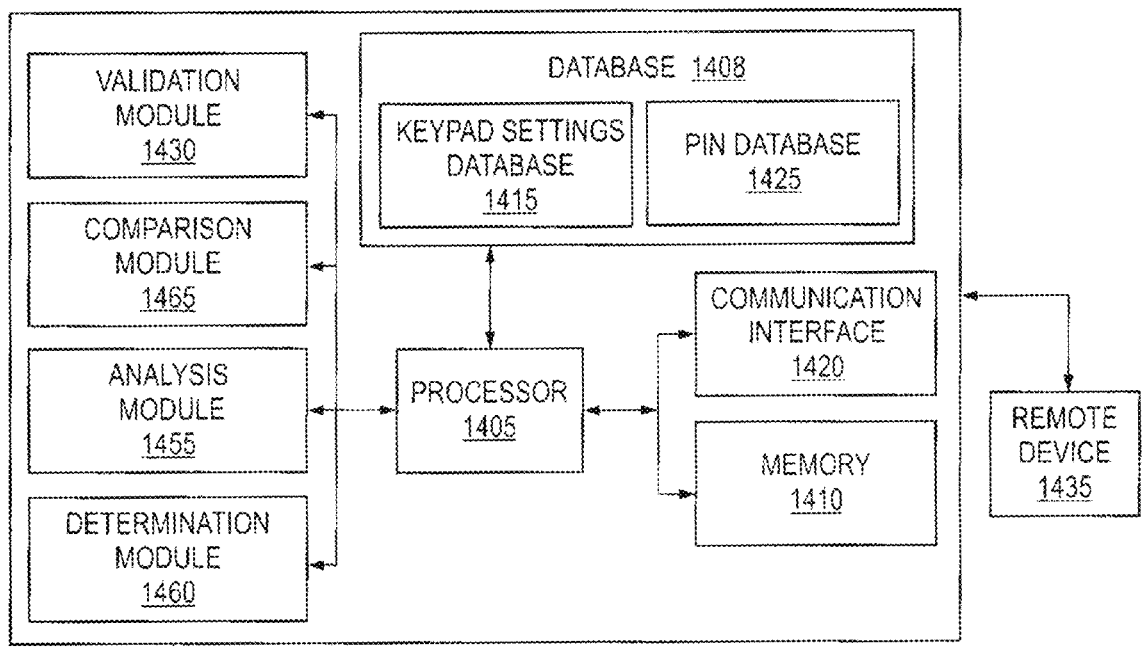
FIG. 14 is a simplified block diagram of a payment server used for facilitating the transaction using a deceptive PIN with the payment card of the cardholder, in accordance with one embodiment of the present disclosure.

FIG. 14 is a simplified block diagram of a payment server 1400 used for facilitating provision of customer transaction amount while purchase at the POS terminal using a payment card, in accordance with one embodiment of the present disclosure. The payment server 1400 may correspond to the payment server 116 of FIG. 1. The payment network 122 may be used by the payment server 1400, the issuer server 1200 and the acquirer server 1300 as a payment interchange network. Examples of payment interchange network include, but not limited to, Mastercard® payment system interchange network. The payment server 1400 includes a processor 1405 configured to extract programming instructions from a memory 1410 to provide various features of the present disclosure. The components of the payment server 1400 provided herein may not be exhaustive and that the payment server 1400 may include more or fewer components than that of depicted in FIG. 14. Further, two or more components may be embodied in one single component, and/or one component may be configured using multiple sub-components to achieve the desired functionalities. Some components of the payment server 1400 may be configured using hardware elements, software elements, firmware elements and/or a combination thereof.

Via a communication interface 1420, the processor 1405 receives the transaction request from a remote device 1435 such as the acquirer server 1300 or the merchant terminal 1100 or the ATM Kiosk 130. The communication may be achieved through API calls, without loss of generality. A keypad settings database 1415 and a PIN database 1425 are embodied in a database 1408 of the payment server 1400. The keypad settings database 1415 stores information corresponding to the customized electronic number pad settings of the electronic number pad (see, the electronic number pad 302 of the payment card 300) from a plurality of customers. The PIN database 1425 stores registered PINS associated with payment cards of customers. The PIN database 1425 also stores registration information from customers using payment cards (e.g., the payment card 300) such as, deceptive character, predefined mathematical expression and predefined value. The keypad settings database 1415 and the PIN database 1425 are in operative communication with a validation module 1430, an analysis module 1455, a determination module 1460 and a comparison module 1465.

The determination module 1460 is configured to receive a plurality of number pad values (equivalent to a deceptive PIN and a deceptive character) from the electronic number pad of the payment card (e.g., the payment card 300) via the communication interface 1420. The determination module 1460 is configured to map the plurality of number pad values from a second set of position to a corresponding first set of positions based on the customized number pad settings information available in the keypad settings database 1415. The analysis module 1455 receives is configured to receive a PIN (also referred to as 'received PIN') provided by the customer during a transaction and determine if the PIN is a deceptive PIN. In some embodiments, the analysis module 1455 receives the deceptive PIN from the determination module 1460. The analysis module 1455 is configured to identify the deceptive character in the deceptive PIN based on the deceptive character stored against the payment card in the PIN database 1425. Further, the analysis module 1455 receives instructions from the processor 1405 to determine an actual character corresponding to the deceptive character by using the predefined mathematical expression and the predefined value stored in the PIN database 1425. Further, the analysis module 1455 reconstructs an actual PIN by replacing the deceptive character with the actual character. The comparison module 1465 receives instruction from the processor 1405 to compare received PIN/actual PIN with stored PIN. Upon detecting a match, the validation module 1430 validates or authenticates the identity of a customer.

The memory 1410 stores details such as Issuer ID, POS ID, country code, acquirer ID, payment card details, acquirer account information, transaction records, merchant account information, and the like. The customer details, the payment card details, the issuer account balance, etc. are validated using the validation module 1430. The validation module 1430 may include one or more predefined rule sets using which the processor 1405 can process the validation. Further, the processor 1405, upon successful validation, sends transaction amount and the merchant parameters to the acquirer server 1300 for crediting the merchant account with the transaction amount.

The processor 1405 is further configured to notify the remote device 1435 of the transaction status via the communication interface 1420. The remote devices, as an example, may be the merchant terminal 104, the merchant interface device 106, the ATM kiosk 130 and the device 114. In one embodiment, the processor 1405 may facilitate a dedicated software application (also referred to as 'the application interface') capable of being installed on the device 114. The cardholder (e.g., the cardholder 110) may access the application interface for registration of the customized electronic number pad settings and registration for services of using deceptive PIN in transactions by providing information such as, a deceptive character, a predefined mathematical expression and a predefined value that has be stored along with payment card information and/or customer data. The cardholder 110 may access the application interface using a web link as well, instead of having a need to install the application on the device 114.

Figure 15:
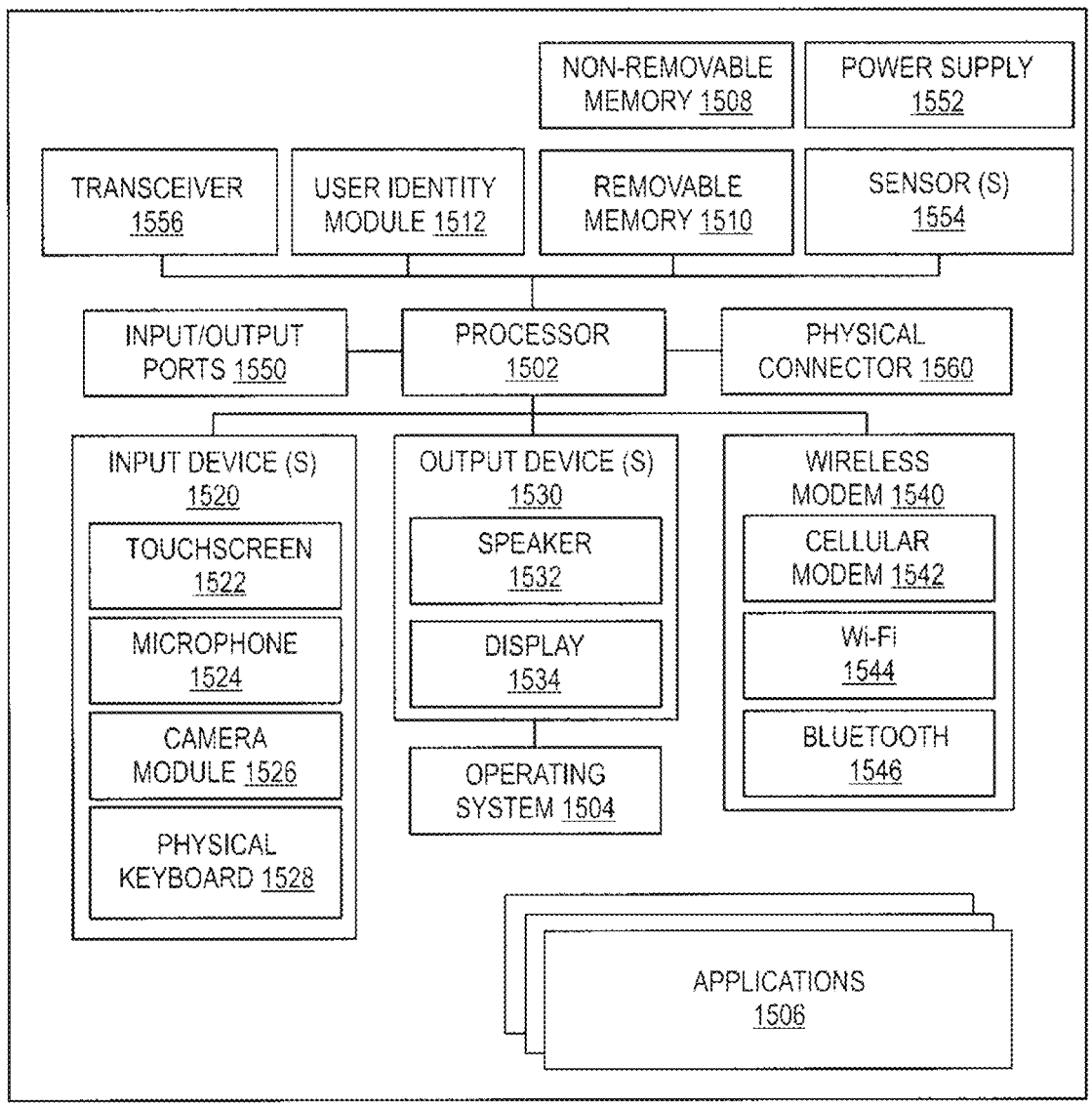
FIG. 15 shows a simplified block diagram of a user device, for example, a mobile phone capable of implementing at least some embodiments of the present disclosure.

FIG. 15 shows simplified block diagram of a user device 1500 for example a mobile phone or a desktop computer capable of implementing the various embodiments of the present disclosure. For example, the user device 1500 may correspond to the device 114 of FIG. 1. The user device 1500 is depicted to include one or more applications 1506.

It should be understood that the user device 1500 as illustrated and hereinafter described is merely illustrative of one type of device and should not be taken to limit the scope of the embodiments. As such, it should be appreciated that at least some of the components described below in connection with that the user device 1500 may be optional and thus in an example embodiment may include more, less or different components than those described in connection with the example embodiment of the FIG. 15. As such, among other examples, the user device 1500 could be any of an electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated user device 1500 includes a controller or a processor 1502 (e.g., a signal processor, microprocessor, ASIC, or other control and processing logic circuitry) for performing such tasks as signal coding, data processing, image processing, input/output processing, power control, and/or other functions. An operating system 1504 controls the allocation and usage of the components of the user device 1500 and support for one or more applications programs, that implements one or more of the innovative features described herein. The applications 1506 may include a payment server application, for example, the application interface for registration of a deceptive character, a predefined mathematical expression and a predefined value. Additionally, the applications 1506 may include common mobile computing applications (e.g., telephony applications, email applications, calendars, contact managers, web browsers, messaging applications such as USSD messaging or SMS messaging or SIM Tool Kit (STK) application) or any other computing application.

The illustrated user device 1500 includes one or more memory components, for example, a non-removable memory 1508 and/or a removable memory 1510. The non-removable memory 1508 and/or the removable memory 1510 may be collectively known as database in an embodiment. The non-removable memory 1508 can include RAM, ROM, flash memory, a hard disk, or other well-known memory storage technologies. The removable memory 1510 can include flash memory, smart cards, or a Subscriber Identity Module (SIM). The one or more memory components can be used for storing data and/or code for running the operating system 1504 and the applications 1506. The user device 1500 may further include a user identity module (UIM) 1512. The UIM 1512 may be a memory device having a processor built in. The UIM 1512 may include, for example, a subscriber identity module (SIM), a universal integrated circuit card (UICC), a universal subscriber identity module (USIM), a removable user identity module (R-UIM), or any other smart card. The UIM 1512 typically stores information elements related to a mobile subscriber. The UIM 1512 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The user device 1500 can support one or more input devices 1520 and one or more output devices 1530. Examples of the input devices 1520 may include, but are not limited to, a touch screen/a display screen 1522 (e.g., capable of capturing finger tap inputs, finger gesture inputs, multi-finger tap inputs, multi-finger gesture inputs, or keystroke inputs from a virtual keyboard or keypad), a microphone 1524 (e.g., capable of capturing voice input), a camera module 1526 (e.g., capable of capturing still picture images and/or video images), a keypad 1528 and a fingerprint sensor 1548. Examples of the output devices 1530 may include, but are not limited to a speaker 1532 and a display 1534. Other possible output devices can include piezoelectric or other haptic output devices. Some devices can serve more than one input/output function. For example, the touch screen 1522 and the display 1534 can be combined into a single input/output device.

A wireless modem 1540 can be coupled to one or more antennas (not shown in the FIG. 15) and can support two-way communications between the processor 1502 and external devices, as is well understood in the art. The wireless modem 1540 is shown generically and can include, for example, a cellular modem 1542 for communicating at long range with the mobile communication network, a Wi-Fi compatible modem 1544 for communicating at short range with an external Bluetooth-equipped device or a local wireless data network or router, and/or a Bluetooth-compatible modem 1546. The wireless modem 1540 is typically configured for communication with one or more cellular networks, such as a GSM network for data and voice communications within a single cellular network, between cellular networks, or between the user device 1500 and a public switched telephone network (PSTN).

The user device 1500 can further include one or more input/output ports 1550 for establishing connection with peripheral devices including the POS terminal 1100, a power supply 1552, one or more sensors 1554 for example, an accelerometer, a gyroscope, a compass, or an infrared proximity sensor for detecting the orientation or motion of the user device 1500 and biometric sensors for scanning biometric identity of an authorized user, a transceiver 1556 (for wirelessly transmitting analog or digital signals) and/or a physical connector 1560, which can be a USB port, IEEE 1294 (FireWire) port, and/or RS-232 port. The illustrated components are not required or all-inclusive, as any of the components shown can be deleted and other components can be added.

Without in any way limiting the scope, interpretation, or application of the claims appearing below, a technical effect of one or more of the example embodiments disclosed herein is to provide computer implemented methods and server systems for facilitating a transaction with a payment card of a customer providing a deceptive PIN. The deceptive PIN used during transactions provides security and prevents theft of personal identity thereby preventing misuse of the payment card by fraudsters. Further, the limitation of changing either a deceptive character or a position of the deceptive character for every transaction ensures that fraudsters do access funds from issuer account by using/manipulating the deceptive PIN easily. The server system ensures that a transaction request will only be processed if the deceptive PIN is verified. Moreover, customization of electronic number pad settings of the payment card provides an additional level of security for a person using the deceptive PIN on a customized electronic number pad. By implementing such additional steps for authenticating the identity of the customer, misuse of payment cards by fraudsters can be mitigated.

The disclosed methods with reference to FIGS. 1 to 15, or one or more operations of the flow diagrams 800 and 850 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Although the disclosure has been described with reference to specific exemplary embodiments, it is noted that various modifications and changes may be made to these embodiments without departing from the broad spirit and scope of the disclosure. For example, the various operations, blocks, etc. described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the server system 1000 (e.g., the servers 116, 118 and 120) and its various components such as the computer system 1005 and the database 1010 may be enabled using software and/or using transistors, logic gates, and electrical circuits (for example, integrated circuit circuitry such as ASIC circuitry). Various embodiments of the disclosure may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), BD (BLU-RAYED Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the invention, as discussed above, may be practiced with steps and/or operations in a different order, and/or with hardware elements in configurations, which are different than those which, are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

The invention claimed is:

1. A method of facilitating a transaction with a payment card of a cardholder, the method comprising:

receiving, by a server system associated with a payment network, a deceptive personal identification number (PIN) comprising a set of characters in which one character is a deceptive character, the deceptive character being different than each of a set of actual characters of an actual PIN of the payment card;

identifying, by the server system, the deceptive character and a position of the deceptive character among the set of characters of the deceptive PIN;

determining, by the server system, a reconstructed PIN by replacing the deceptive character with a corresponding actual character at the position in the deceptive PIN, wherein the actual character is determined based at least on a predefined mathematical expression and a predefined value for the predefined mathematical expression;

authenticating, by the server system, the reconstructed PIN by matching the reconstructed PIN with the actual PIN; and upon successful authentication, facilitating, by the server system, the transaction.

2. The method as claimed in claim 1, further comprising:

accessing, by the server system, a primary deceptive character and a primary position of the primary deceptive character in a preceding transaction, the preceding transaction being a last transaction immediately prior to the transaction;

checking, by the sever system, if the primary deceptive character and the primary position are same as the deceptive character and the position of the deceptive character, respectively in the transaction; and upon determining the deceptive character to be same as the primary deceptive character and the position of the deceptive character to be same as the primary position of the primary deceptive character, declining, by the server system, the transaction.

3. The method of claim 1, further comprising:

receiving, by the server system, a registration request for using the deceptive character prior to using the deceptive PIN, the registration request comprising a payment card information of the payment card, the deceptive character, the predefined mathematical expression and the predefined value; and upon successful verification of the registration request, by the server system, storing the predefined mathematical expression, the predefined value and the deceptive character for the payment card of the cardholder.

4. The method of claim 3, further comprising:

provisioning, by the server system, an option for the cardholder to update the deceptive character, wherein the cardholder initiates the registration request for updating the deceptive character.

5. The method of claim 3, wherein determining the reconstructed PIN comprises:

determining, by the server system, a subset of characters of the set of characters by removing the deceptive character from the set of characters;

defining, by the server system, an intermediate expression based on the subset of characters, the predefined value and the predefined mathematical expression; and solving, by the server system, the intermediate expression for determining the actual character.

6. The method of claim 1, wherein the payment card comprises an electronic number pad.

7. The method of claim 6, further comprising:

receiving, by the server system, a registration request comprising a pattern and the deceptive character, wherein the pattern and the deceptive character are provided by the cardholder on the electronic number pad prior to using the deceptive PIN.

8. The method of claim 7, wherein the pattern comprises one or more number pad values for registration of the deceptive character.

9. The method of claim 7, further comprising;

receiving, by the server system, a number pad registration request, the number pad registration request comprising a mapping of a first set of positions of keypad inputs in the electronic number pad to a second set of positions in the electronic number pad for providing user defined keypad outputs; and storing, by the server system, the mapping.

10. The method of claim 9, wherein receiving the deceptive PIN comprises:

receiving, by the server system, a plurality of number pad values of the payment card comprising at least the deceptive character and the deceptive PIN, wherein each number pad value of the plurality of number pad values corresponds to a respective keypad input in the electronic number pad at the second set of positions; and mapping, by the server system, the plurality of number pad values from the second set of positions to the first set of positions for identifying the deceptive character and the deceptive PIN.

11. A server system for facilitating a transaction with a payment card of a cardholder, the server system comprising:

a memory comprising stored instructions; and at least one processor configured to execute the stored instructions to cause the server system to perform at least:

receiving a deceptive personal identification number (PIN) comprising a set of characters in which one character is a deceptive character, the deceptive character being different than each of a set of actual characters of an actual PIN of the payment card, identifying the deceptive character and a position of the deceptive character among the set of characters of the deceptive PIN, determining a reconstructed PIN by replacing the deceptive character with a corresponding actual character at the position in the deceptive PIN, wherein the actual character is determined based at least on a predefined mathematical expression and a predefined value for the predefined mathematical expression, authenticating the reconstructed PIN by matching the reconstructed PIN with the actual PIN, and upon successful authentication, facilitating the transaction.

12. The server system of claim 11, wherein the at least one processor is configured to execute the stored instructions to further cause the server system to perform at least:

accessing a primary deceptive character and a primary position of the primary deceptive character in a preceding transaction, the preceding transaction being a last transaction immediately prior to the transaction;

checking if the primary deceptive character and the primary position are same as the deceptive character and the position of the deceptive character, respectively in the transaction; and upon determining the deceptive character to be same as the primary deceptive character and the position of the deceptive character to be same as the primary position of the primary deceptive character, declining the transaction.

13. The server system of claim 11, wherein the at least one processor is configured to execute the stored instructions to further cause the server system to perform at least:

receiving a registration request for using the deceptive character prior to using the deceptive PIN, the registration request comprising a payment card information of the payment card, the deceptive character, the predefined mathematical expression and the predefined value; and upon successful verification of the registration request, storing the predefined mathematical expression, the predefined value and the deceptive character for the payment card of the cardholder.

14. The server system of claim 11, wherein the payment card comprises an electronic number pad.

15. The server system of claim 14, wherein the at least one processor is configured to execute the stored instructions to further cause the server system to perform at least:

receiving a registration request comprising a pattern and the deceptive character, wherein the pattern and the deceptive character are determined and provided by the cardholder on the electronic number pad prior to using the deceptive PIN.

16. The server system of claim 14, wherein the at least one processor is configured to execute the stored instructions to further cause the server system to perform at least:

receiving a number pad registration request, the number pad registration request comprising a mapping of a first set of positions of keypad inputs in the electronic number pad to a second set of positions in the electronic number pad for providing user defined keypad outputs; and storing the mapping.

17. The server system of claim 16, wherein for receiving the deceptive PIN, the at least one processor is configured to execute the stored instructions to further cause the server system to perform at least:

receiving a plurality of number pad values of the payment card comprising at least the deceptive character and the deceptive PIN, wherein each number pad value of the plurality of number pad values corresponds to a respective keypad input in the electronic number pad at the second set of positions; and mapping the plurality of number pad values from the second set of positions to the first set of positions for identifying the deceptive character and the deceptive PIN.

18. A method of facilitating a transaction with a payment card of a cardholder, the method comprising:

receiving, by a server system associated with a payment network, a deceptive personal identification number (PIN) for performing the transaction using the payment card of the cardholder, the deceptive PIN comprising a set of characters in which one character is a deceptive character, the deceptive character being different than each of a set of actual characters of an actual PIN of the payment card;

identifying, by the server system, the deceptive character and a position of the deceptive character among the set of characters of the deceptive PIN;

determining, by the server system, a validity of the transaction by performing at least accessing, by the server system, a primary deceptive character and a primary position of the primary deceptive character in a preceding transaction, the preceding transaction being a last transaction immediately prior to the transaction, comparing, by the sever system, the primary deceptive character with the deceptive character and the primary position of the primary deceptive character with the position of the deceptive character, and upon determining the primary deceptive character to be same as the deceptive character and the primary position of the primary deceptive character to be same as the position of the deceptive character, declining, by the server system, the transaction;

upon determining successful validity of the transaction, determining, by the server system, a reconstructed PIN by replacing the deceptive character with a corresponding actual character at the position in the deceptive PIN, the actual character being determined based on a predefined value, a predefined mathematical expression and a subset of characters of the set of characters;

authenticating, by the server system, the reconstructed PIN by matching the reconstructed PIN with the actual PIN; and upon successful authentication, facilitating, by the server system, the transaction.

19. The method of claim 18, further comprising:

receiving, by the server system, a registration request for using the deceptive character prior to using the deceptive PIN, the registration request comprising a payment card information of the payment card, the deceptive character, the predefined mathematical expression and the predefined value; and upon successful verification of the registration request, by the server system, storing the predefined mathematical expression, the predefined value and the deceptive character for the payment card of the cardholder.

20. The method of claim 18, wherein determining the reconstructed PIN comprises:

determining, by the server system, a subset of characters of the set of characters by removing the deceptive character from the set of characters;

defining, by the server system, an intermediate expression based on the subset of characters, the predefined value and the predefined mathematical expression; and solving, by the server system, the intermediate expression for determining the actual character.

\* \* \* \* \*